(12) United States Patent
Shibata et al.

(10) Patent No.: US 7,892,497 B2
(45) Date of Patent: Feb. 22, 2011

(54) ORGANIC SYNTHESIZER

(75) Inventors: Masatoshi Shibata, Tokyo (JP); Yutaka Mashiyama, Tokyo (JP); Yasuyuki Suzuki, Tokyo (JP); Isamu Hiruta, Tokyo (JP); Toshiaki Wada, Tokyo (JP); Tetsuo Tomoda, Tokyo (JP)

(73) Assignee: Sibata Scientific Technology Ltd. (JP)

( * ) Notice: Subject to any disclaimer, the term of this patent is extended or adjusted under 35 U.S.C. 154(b) by 402 days.

(21) Appl. No.: 12/063,475

(22) PCT Filed: Aug. 10, 2006

(86) PCT No.: PCT/JP2006/315810
§ 371 (c)(1),
(2), (4) Date: Mar. 28, 2008

(87) PCT Pub. No.: WO2007/020864
PCT Pub. Date: Feb. 22, 2007

(65) Prior Publication Data
US 2009/0232712 A1    Sep. 17, 2009

(30) Foreign Application Priority Data

| Aug. 17, 2005 | (JP) | ............................. 2005-236894 |
| Aug. 17, 2005 | (JP) | ............................. 2005-236895 |
| Aug. 25, 2005 | (JP) | ............................. 2005-243724 |
| Mar. 23, 2006 | (JP) | ............................. 2006-080198 |
| Mar. 23, 2006 | (JP) | ............................. 2006-080200 |

(51) Int. Cl.
| B01J 19/18 | (2006.01) |
| B01J 19/00 | (2006.01) |
| B01J 19/24 | (2006.01) |
| B01F 7/00 | (2006.01) |
| B01F 13/08 | (2006.01) |

(52) U.S. Cl. ...................... 422/135; 422/131; 422/224; 422/230; 366/244; 366/273; 366/274

(58) Field of Classification Search ................. 422/131, 422/135, 224, 230; 366/274, 273, 244, 241
See application file for complete search history.

(56) References Cited

U.S. PATENT DOCUMENTS

| 4,491,421 | A | 1/1985 | Koehl et al. |
| 2002/0172629 | A1* | 11/2002 | Jahn et al. .................... 422/187 |
| 2003/0058736 | A1 | 3/2003 | Nielsen |
| 2003/0156989 | A1* | 8/2003 | Safir et al. .................... 422/99 |
| 2005/0232074 | A1* | 10/2005 | Higashihara et al. ........ 366/273 |

FOREIGN PATENT DOCUMENTS

| JP | 73734/1193 | 7/1995 |
| JP | 11-137990 | 5/1999 |
| JP | 2003-075451 | 3/2003 |
| JP | 2006-015269 | 1/2006 |

* cited by examiner

Primary Examiner—Walter D Griffin
Assistant Examiner—Natasha Young
(74) Attorney, Agent, or Firm—Clark Hill PLC

(57) ABSTRACT

To provide an organic synthesizer that can conduct a pressure reaction and an atmospheric reaction in one organic synthesizer and can realize attachment of reaction vessels to the organic synthesizer and detachment of the reaction vessels from the organic synthesizer without applying any load to gas supply/discharge pipes. An organic synthesizer comprising a reaction vessel support part (160), which can support two or more reaction vessels, and pressure regulation means (164) for regulating the pressure within the reaction vessel supported by the reaction vessel support part (160) by supplying/discharging gas. Two or more pressure regulation means (164) are provided for each reaction vessel supported by the reaction vessel support part (160). At least one pressure regulation means (164A) in the two or more pressure regulation means (164) is constructed so as to be detachable from and attachable to the other pressure regulation means (164B). The pressure regulation means (164) comprises gas supply/discharge pipes (174a to 174d) and openings (194a to 194d) for supporting the gas supply/discharge pipes (174a to 174d). The gas supply/discharge pipes (174a to 174d) are constructed so that a part near the front end can be flexed in a vertical direction and in a lateral direction and are connected to the supported reaction vessels for gas supply and discharge.

4 Claims, 26 Drawing Sheets

ORGANIC SYNTHESIZER

RELATED/PRIORITY APPLICATION

This application is a National Phase filing regarding International Application No. PCT/JP2006/315810, filed on Aug. 10, 2006. International Application No. PCT/JP2006/315810 relies upon Japanese Patent Application Nos. 2005-236894, 2005-236895, 2005-243724, 2006-080198 and 2006-080200 for priority.

TECHNICAL FIELD

The present invention relates to an organic synthesizer for reagent stirring, heating and pressure regulating in reaction vessels to synthesize reagents contained in the reaction vessels.

BACKGROUND ART

An organic synthesizer has been used to synthesize many types of samples at once under an identical condition or different conditions and examine the synthesized samples in unison. Examples of such the organic synthesizer include an organic synthesizer of the atmospheric type that stirs and heats samples within reaction vessels at normal pressure to synthesize the samples contained within the reaction vessels (see Patent Document 1), and another organic synthesizer of the pressure regulating type that is capable of regulating pressures in the reaction vessels, such as pressurizing and depressurizing, in addition to stirring/heating the samples. The organic synthesizer of the pressure regulating type mainly comprises, as shown in FIGS. 28 and 29, a reaction vessel support 300 capable of supporting plural reaction vessels 306, a stirring unit 302 operative to stir samples in the reaction vessels, and a pressure regulating unit 304 operative to regulate pressures in the reaction vessels supported on the reaction vessel support 300.

The reaction vessel support 300 includes four pressure-proof vessels 308 provided for associated reaction vessels 306 to contain four respective reaction vessels 306, four support bodies 310 for supporting the pressure-proof vessels 308, and a cover member 312 for surrounding the pressure-proof vessels 308 and the support bodies 310. The pressure-proof vessel 308 includes, as shown in FIG. 29, a pressure-proof vessel body 308a formed in the shape of a bottomed-cylinder having an upper opening for containing the reaction vessel 306 therein, and a pressure-proof vessel lid 308b capable of hermetically closing the opening in the pressure-proof vessel body 308a. The pressure-proof vessel lid 308b has an upper surface, which is connected to a later-described gas supply/discharge pipe 314.

The stirring unit 302 includes rotary magnet units 316A-316E configured capable of rotating magnets and located at respective positions aligned with the support bodies 310 in a cabinet 318. Each reaction vessel 306 contains a stirrer 320 composed of a magnetic substance, together with a sample, as shown in FIG. 29. The displacements of the magnetic field in accordance with rotations of the rotary magnet units 316A-316E are utilized to cause the stirrer 320 to rotationally move to stir the sample. FIG. 30 is a schematic view showing a driving arrangement associated with the rotary magnet units 316A-316E. A drive belt 324 is suspended around the rotary magnet units 316A-316E together with a drive pulley 322 connected to a drive source such as a motor as shown in FIG. 30 such that the rotary magnet units can rotate in relation to the drive pulley 322. The method of moving the floated stirrer 320 in accordance with the displacements of the magnetic field is called the magnetic stirrer scheme and widely used in organic synthesizers in general to stir samples. The stirring unit 302 also includes a heating unit (not shown) operative to heat the lower portion of the reaction vessel 306.

The pressure-regulating unit 304 is configured to supply or discharge a hydrogen or nitrogen gas to/from the reaction vessels 306 supported on the reaction vessel support 310 to regulate pressures in the reaction vessels 306. It includes a gas supply/discharge pipe 314 extending from a pressure regulating unit cabinet 326 and connected to the pressure-proof vessel 308.

Patent Document 1: JP-A 11-137990

DISCLOSURE OF THE INVENTION

Problems to be Solved by the Invention

In the above organic synthesizer, the rotary magnet units 316A-316E in the stirring unit are configured to rotate using the single drive pulley 322 (motor) as shown in FIG. 30. Accordingly, all the reaction vessels 306 must have the same stirring speed though there is a need for the reaction vessels 306 to have different stirring speeds individually. In response to this need, it may be considered to provide motors for associated rotating magnetic forces. The rotary magnet units 316A-316E are, though, provided in parallel with the supported associated reaction vessels 306. In this case, magnetic forces from adjacent rotary magnet units 316A-316E mutually affect and cause a problem because the stirring speeds cannot be adjusted easily. For example, even if a lower speed rotation is intended, a higher speed rotation may result when an adjacent rotary magnet unit 316A-316E rotates at a higher speed. This is a first problem.

In addition, in the above organic synthesizer, even if a reaction condition such as a reaction temperature for one reaction vessel 306 is made same as those for other reaction vessels, the need for setting respective reaction conditions for the associated reaction vessels 306 results in a complicated setting work therefor. This is a second problem.

Further, in the above organic synthesizer, as shown in FIG. 29, the stirrer 320 is put in the reaction vessel 306 as it is. Accordingly, if the stirred sample is a granule, the granule is sandwiched between the stirrer 320 and the reaction vessel 306 and crushed to change the state of the sample as a problem. In addition, during the rotational motion of the stirrer 320, friction with the reaction vessel 306 abrades the stirrer 320 as a problem. Further, the use of reaction vessels of PTFE (Poly Tetra Fluoro Ethylene) results in abraded reaction vessels. This is a third problem.

Furthermore, in the above organic synthesizer, application of uniform rotations to the samples within the reaction vessels 306 requires the central axes of the reaction vessels 306 to be matched with the centers of rotation of the rotary magnet units 316A-316E. To do so, first, the central axes of the housing portions of the pressure-proof vessels 308 are made coincident with the centers of rotation of the rotary magnet units 316A-316E. Then, the reaction vessels 306 are molded such that they can be housed tightly in the housing portions of the pressure-proof vessels 308. The reaction vessels 306 cannot be molded easily, however, such that they can be housed tightly in the housing portions of the pressure-proof vessels 308. When housed, a gap may be formed between the outer circumferential surface of the reaction vessel 306 and the inner circumferential surface of the housing portion of the pressure-proof vessel 308. This gap may prevent the central axis of the reaction vessel 306 from matching the center of rotation of the rotary magnet unit 316A-316E. In addition, the friction with the stirrer and the counteraction of the reaction liquid in the reaction vessel in accordance with the rotation of the stirrer may cause the reaction vessel to rotate in synchronization with the stirrer to result in insufficient stirring. This is a fourth problem.

In addition, in the above organic synthesizer, simultaneous execution of a pressure-regulated reaction and a general atmospheric reaction requires the use of individually prepared organic synthesizers of the pressure-regulated type and the atmospheric type even without the use of all supportable organic synthesizers. Such the use of the pressure-regulated type and the atmospheric type individually prepared requires a wider place than the use of either one and may cause errors in the reaction conditions between both, such as the stirring condition and the heating condition, other than the reaction pressure. This is a fifth problem.

Further, in the above organic synthesizer of the pressure-proof type, removal of the reaction vessel from the organic synthesizer requires removal of the tip of the gas supply/discharge pipe 314 from the pressure-proof vessel lid 308b and shift from the vertical axis of the reaction vessel 306 as shown in FIGS. 31A and 31B. The gas supply/discharge pipe 314 is, however, composed of a relatively hard material. Therefore, when it is shifted upwardly or laterally, a load may be imposed on the joint to cause gas leakage possibly. In particular, in the organic synthesizer, until the removal of the reaction vessel 306 is finished, pressing the gas supply/discharge pipe 314 required in the direction shifted upwardly or laterally may easily impose a load on the joint. This is same as when the reaction vessel is attached to the organic synthesizer. This is a sixth problem.

The present invention has a first object to solve the above first problem and provide an organic synthesizer capable of achieving stable rotations from a lower speed rotation to a higher speed rotation and easily setting the numbers of revolutions individually without suffering any influence from an adjacent magnet.

The present invention has a second object to solve the above second problem and provide an organic synthesizer capable of easily setting a reaction condition for one reaction vessel same as those for other reaction vessels.

The present invention has a third object to solve the above third problem and provide an organic synthesizer capable of stirring a reagent within a reaction vessel without bringing a stirrer in contact with the reaction vessel.

The present invention has a fourth object to solve the above fourth problem and provide an organic synthesizer capable of matching the central axis of a reaction vessel with the center of rotation of a rotating means, when housed, even if a gap is formed between an outer circumferential surface of the reaction vessel and an inner circumferential surface of a reaction vessel container.

The present invention has a fifth object to solve the above fifth problem and provide an organic synthesizer capable of a pressure reaction and an atmospheric reaction in a single organic synthesizer.

The present invention has a sixth object to solve the above sixth problem and provide an organic synthesizer capable of detachment/attachment of a reaction vessel from/to the organic synthesizer without imposing no load on a gas supply/discharge pipe.

Means to Solve the Problems

To achieve the above first object, a first invention provides an organic synthesizer, comprising: a reaction vessel support capable of supporting two or more reaction vessels; and two or more stirring means provided at respective positions aligned with the reaction vessels supported on the reaction vessel support and operative to move stirrers contained together with reagents within the supported reaction vessels in accordance with displacements of the magnetic field so as to stir the reagents within the supported reaction vessels, the organic synthesizer further comprising a magnetic field shielding means operative to prevent the displacement of the magnetic field on one of the adjacent two or more stirring means from influencing on the magnetic field on the other stirring means.

As described, the organic synthesizer according to the first invention comprises a magnetic field shielding means operative to prevent the displacement of the magnetic field on one of adjacent stirring means from influencing on the magnetic field on the other stirring means. Accordingly, it is possible to easily adjust respective stirring speeds without suffering the influence from the displacements of the magnetic field on adjacent stirring means. In the organic synthesizer according to the present invention, preferably, the magnetic field shielding means is formed in the shape of a ring that surrounds the portion of the stirring means where the displacement of the magnetic field arises.

To achieve the above second object, a second invention provides an organic synthesizer, comprising: a reaction vessel support capable of supporting two or more reaction vessels; a heating means operative to heat the interiors of the reaction vessels supported on the reaction vessel support; stirring means operative to stir reagents within the reaction vessels supported on the reaction vessel support; and a control means operative to control at least the heating means and the stirring means, wherein the control means is configured capable of setting reaction conditions for the associated reaction vessels supported on the reaction vessel support, wherein a reaction condition set for each reaction vessel is configured capable of being synchronized with reaction conditions set for other reaction vessels.

As described, in the organic synthesizer according to the second invention, a reaction condition set for each reaction vessel is configured capable of being synchronize with reaction conditions set for other reaction vessels. Accordingly, a reaction condition set for one reaction vessel can be easily set same as those for other reaction vessels.

To achieve the above third object, a third invention provides an organic synthesizer, comprising a stirring means provided at a position aligned with a supported reaction vessel and operative to rotate a stirrer contained together with a reagent within the supported reaction vessel in accordance with displacements of the magnetic field so as to stir the reagent within the supported reaction vessel, wherein the stirring means includes a stirring member formed in the shape of a rod extending vertically, wherein the stirring member has an upper end rotatably supported at the upper portion of the reaction vessel and a lower end immersed into the reagent within the reaction vessel and configured capable of gripping the stirrer under the immersed condition.

As described, in the organic synthesizer according to the third invention, a stirring member is provided to suspend the stirrer rotatably without bringing it into contact with the reaction vessel. Accordingly, even if the stirred sample is a granule, the granule is prevented from being sandwiched between the stirrer and the reaction vessel and crushed to change the state of the sample. In addition, it is possible to prevent the stirrer and the reaction vessel from being worn. Further, the stirring member, which is configured to stir the reagent in the reaction vessel as in the present invention, can reproduce a stirring system similar to a mass production system. Accordingly, it is possible to obtain experimental data as if in a mass production site. Furthermore, the organic synthesizer according to the present invention uses the stirring unit like in the magnetic stirrer scheme of prior art. Accordingly, it is possible to provide an inexpensive, highly versatile organic synthesizer.

Preferably, the organic synthesizer according to the third invention further comprises a pressure regulating means having a pressure-proof vessel capable of housing the reaction vessel hermetically and operative to regulate pressure in the reaction vessel housed within the pressure-proof vessel, wherein the stirring member has an upper end supported inward from the upper surface of the pressure-proof vessel. The upper end of the stirring member thus supported inward from the upper surface of the pressure-proof vessel allows the stirring member to be located even in a hermetic reaction vessel.

Preferably, the stirring member has blades protruding sideward or tangentially from the stirring member Providing such the blades enables stirring not only in the vicinity of the stirrer but also over a wider range. Accordingly, it is possible to easily execute stirring even if the reagent is highly viscose or separated in multi-layers.

Preferably, the stirring member has an opening formed therethrough such that the stirrer can be inserted therein, wherein the stirring member includes a stirrer-fixing member capable of pressing from above or beneath the stirrer inserted into the opening to fix the stirrer. Such the arrangement makes it possible to fix the stirrer to the stirring member even if the size of the opening is formed larger than the outer diameter of the stirrer. Preferably, the stirrer-fixing member is formed in the shape of a ring and configured capable of being screwed to a portion above or beneath the opening in the stirring member. Preferably, the stirrer-fixing member is configured to press the stirrer as it screws into the opening.

Preferably, the organic synthesizer further comprises a stirring member support non-rotatably attached to the reaction vessel, wherein the stirring member has an upper end with a cavity portion formed therefrom down to a certain depth, wherein the stirring member support is configured to locate a lower end thereof in the cavity portion in the stirring member to rotatably support the stirring member. Such the arrangement allows shavings and worn pieces resulted from the rotation of the stirring member to be accumulated in the cavity portion and prevented from mixing into the reaction vessel as low as possible.

To achieve the above fourth object, a fourth invention provides an organic synthesizer, comprising: a reaction vessel container formed in the shape of a bottomed-cylinder capable of containing a reaction vessel therein; and a stirring means provided at a position aligned with the reaction vessel contained in the reaction vessel container and operative to rotate a stirrer contained together with a reagent within the reaction vessel in accordance with displacements of the magnetic field so as to stir the reagent within the supported reaction vessel, wherein the reaction vessel container includes an urging means operative to urge the reaction vessel such that the contained reaction vessel is arranged at a position where a central axis thereof matches the central position of the reaction vessel container.

As described, the fourth invention includes an urging means operative to urge the reaction vessel such that the contained reaction vessel is arranged at a position where a central axis thereof matches the central position of the reaction vessel container. Accordingly, it is possible to match the central axis of the reaction vessel with the center of rotation of the rotating means, when housed, even if a gap is formed between the outer circumferential surface of the reaction vessel and the inner circumferential surface of the reaction vessel container. In addition, the urging means can urge the reaction vessel in place. Accordingly, it is possible to prevent the reaction vessel from rotating in accordance with the rotation of the stirrer.

In the organic synthesizer according to the fourth invention, the reaction vessel container may be sufficient if it can contain the reaction vessel therein. In the organic synthesizer of the atmospheric type, the reaction vessel support in the shape of the bottomed-cylinder in the organic synthesizer body corresponds to the reaction vessel container. In the organic synthesizer of the pressure-regulated type, the pressure-proof vessel corresponds to the reaction vessel container.

Preferably, in the organic synthesizer according to the fourth invention, the reaction vessel container has an inner circumferential surface with a groove formed along the entire circumference, wherein the urging means is arranged in the groove and formed in the shape of an annulus having at least three corners and is configured such that part of each side protrudes inward from the groove.

To achieve the above fifth object, an organic synthesizer according to a fifth invention comprises: a reaction vessel support capable of supporting two or more reaction vessels; and pressure regulating means provided two or more for associated reaction vessels supported on the reaction vessel support and operative to supply or discharge gases so as to regulate pressures in the reaction vessels supported on the reaction vessel support, wherein the two or more pressure regulating means include one or more pressure regulating means configured detachably attachable to other pressure regulating means.

In the organic synthesizer according to the fifth invention, two or more pressure regulating means include one or more pressure regulating means that can be removed from other pressure regulating means. Accordingly, the reaction vessel corresponding to the removed one or more pressure regulating means can be used in an atmospheric reaction, and a pressure reaction and an atmospheric reaction can be executed in a single organic synthesizer.

To achieve the above sixth object, an organic synthesizer according to a sixth invention comprises: a reaction vessel support capable of supporting a reaction vessel; and a pressure regulating means operative to supply or discharge a gas so as to regulate pressure in the reaction vessel supported on the reaction vessel support, wherein the pressure regulating means includes a gas supply/discharge pipe configured such that the vicinity of the tip thereof is capable of flexing vertically and laterally and connected to the supported reaction vessel for supplying and discharging the gas, and a gas supply/discharge pipe support configured to support the gas supply/discharge pipe, wherein the gas supply/discharge pipe support is configured such that the vicinity of the tip of the gas supply/discharge pipe moves to an upper position from the position connected to the reaction vessel, then moves from the upper position to a position shifted to either left or right from the vertical axis of the reaction vessel, and stays at the position. Preferably, in the organic synthesizer, the gas supply/discharge pipe is partly formed helical.

In the organic synthesizer according to the sixth invention, the gas supply/discharge pipe support is configured such that the vicinity of the tip of the gas supply/discharge pipe moves to an upper position from the position connected to the reaction vessel, then moves from the upper position to a position shifted to either left or right from the vertical axis of the reaction vessel, and stays at the position. Accordingly, it is possible to easily execute detachment/attachment of the reaction vessel from/to the organic synthesizer.

EFFECTS OF THE INVENTION

As described above, the organic synthesizer according to the first invention is capable of achieving stable rotations from a lower speed rotation to a higher speed rotation and easily setting the numbers of revolutions individually without suffering any influence from an adjacent magnet.

In the organic synthesizer according to the second invention, it is configured capable of being synthesized with reaction conditions set for other reaction vessels. Accordingly, it is possible to provide an organic synthesizer capable of easily setting a reaction condition for one reaction vessel same as those for other reaction vessels.

The organic synthesizer according to the third invention is possible to provide an organic synthesizer capable of stirring a reagent within a reaction vessel without bringing a stirrer in contact with the reaction vessel.

The organic synthesizer according to the fourth invention is possible to provide an organic synthesizer capable of matching the central axis of a reaction vessel with the center of rotation of a rotating means, when the reaction vessel is housed, even if a gap is formed between an outer circumferential surface of the reaction vessel and an inner circumferential surface of a reaction vessel container.

The organic synthesizer according to the fifth invention is possible to provide an organic synthesizer capable of a pressure reaction and an atmospheric reaction in a single organic synthesizer.

The organic synthesizer according to the sixth invention is possible to provide an organic synthesizer capable of detachment/attachment of a reaction vessel from/to the organic synthesizer without imposing no load on a gas supply/discharge pipe.

THE BEST MODE FOR CARRYING OUT THE INVENTION

Organic synthesizers according to examples of the present invention will now be described next based on the drawings.

First Example

Referring to FIGS. 1-7, an organic synthesizer according to an example of a first invention and a second invention (hereinafter referred to as a "first example") is described. FIG. 1 is a front schematic view showing the organic synthesizer according to the first example in use. The organic synthesizer according to the present example comprises a reaction vessel support 10 capable of supporting four reaction vessels 8, and a stirring unit 12 operative to stir samples in the reaction vessels 8 gripped by the reaction vessel support 10. The reaction vessel support 10 and the stirring unit 12 are configured separable from each other.

The reaction vessel supports 10 are provided for the associated reaction vessels 8 and include four reaction vessel holders 14 connected to the respective reaction vessels 8, four reagent adders 16, and a frame 18 for supporting the four reaction vessel holders 14. The reaction vessel holders 14 include four top plates 20, and four returning blocks 22 provided beneath the top plates 20 for cooling vaporized substances in the reaction vessels 8 back to liquids again. The top plates 20 and the returning blocks 22 have through-bores formed therethrough and aligned such that the reagent adders 16 can be inserted therein. The top plates 20 have front and rear edges provided with fixing screws 20*a* for use in fixing the top plates 20 to the frame 18. The frame 18 has an upper surface provided with grip portions 18*a* that enable the frame 18 to be gripped.

The stirring unit 12 includes, as shown in FIG. 1-3, a housing 24, heating units 26*a*-26*d* arranged on the upper surface of the housing 24 to heat the reaction vessels 8 from beneath, rotary magnet units 28 for rotating rotary chips housed in the reaction vessels 8, and a control unit 30 (see FIG. 5) for controlling reaction conditions.

The heating units 26*a*-26*d* are provided for the associated reaction vessels 8 supported on the reaction vessel support 10 and configured such that respective heating temperatures can be set individually as described later. The heating units 26*a*-26*d* have insertion bores for receiving the reaction vessels 8 tightly inserted therein and is configured to heat the reaction vessels 8 inserted in the insertion bores from heaters, not shown.

The rotary magnet units 28 are provided for the associated reaction vessels 8 supported on the reaction vessel support 10 and each includes a rotary plate 32 in the shape of a disc, and a pair of magnets 34, 34 provided at opposite positions on the rotary plate 32. These magnets 34, 34 are provided in opposite relations of "N" and "S". Beneath the rotary plates 32, motors 36*a*-36*d* are provided to rotate the rotary plates 32. The motors 36*a*-36*d* have respective bodies of which upper surfaces are fixed to the bottom of a stationary plate 38 provided in the housing 24. The motors 36*a*-36*d* have respective axial centers passing through bores formed through the stationary plate 38 and coupled with the centers of the rotary plates 32 located above the stationary plate 38. The stationary plate 38 are supported on columns 42 provided at four corners of the stationary plate 38 via vibration isolators 40 composed of a resilient member such as a rubber.

In the present example, magnetic field shielding members 44 are provided on the stationary plate 38, surrounding the outer circumferences of the rotary magnet units 28, for the associated rotary magnet units 28 via fixing members 46. Preferably, the magnetic shielding members 44 are composed of a magnetic field absorbable material such as iron and at least have a height higher than that of the rotary magnet units 28.

Like in the organic synthesizer of prior art, the rotary magnet units 28 are provided in parallel with each other in the present example. The magnetic field shielding members 44 are, though, provided for the associated the rotary magnet units 28 and accordingly cannot be affected from adjacent other rotary magnet units 28. Therefore, when the motors 36*a*-36*d* drive the rotary magnet units 28 rotationally, the rotary chips contained together with the reagents in the reaction vessels 8 rotate and stir the solutions in the reaction vessels 8. In this case, though, the magnetic field shielding members 44 can shield the influences from adjacent fluxes. Accordingly, it is possible to provide stable rotations without suffering the influences from rotations of adjacent rotary magnet units 28 even if the rotation speed is made different from those of adjacent rotary magnet units 28.

As shown in FIGS. 1-5, the control unit 30 includes a first control unit 30*a* through a fourth control unit 30*d* operative to control reaction conditions for the associated rotary magnet units 28 supported on the reaction vessel support 10, and a fifth controller 30*e* operative to control the first control unit 30*a* through the fourth control unit 30*d*. The first control unit 30*a* through the fourth control unit 30*d* and the fifth control unit 30*e* are connected with each other over a bus 48 and configured capable of sending/receiving signals. The first control unit 30a includes a first input unit 50a operative to input control information, a first display unit 52a operative to display the input information and measured information such as temperatures, a first rotation control unit 54a operative to control the number of revolutions of the motor 36a based on the input information, a first temperature control unit 56a operative to control the heating temperature at the heater unit 26a, and a first synchronization control unit 58a. The first control unit 30a is configured to control the number of revolutions of the motor 36a and the heating temperature at the heater unit 26a based on the reaction condition input at the first input unit 50a. Similar to the first control unit 30a, the second control unit 30b through the fourth control unit 30d include a second through a fourth input unit 50b-50d, a second through a fourth display unit 52b-52d, a second through a fourth rotation control unit 54b-54d, a second through a fourth temperature control unit 56b-56d, and a second through a fourth synchronization control unit 58b-58d. The fifth control unit 30e includes a fifth input unit 50e, a fifth display unit 50e, and a synchronization control unit 58e. The first through fifth control units 58a-58e are configured to use the input from the fifth input unit 50e to determine either one of the first through fourth control units 30a-30d to serve as a main control unit and either one of the others to serve as a sub control unit operable in synchronization with the reaction condition in the main control unit. The synchronization among reaction conditions herein means that the setting conditions for the first through fourth rotation control units 54a-54d and the setting conditions for the first through fourth temperature control units 56a-56d are set identical. The fifth control unit 30e may be a personal computer or the like connected to an external terminal of the organic synthesizer. It may be configured only with the first control unit 30a through the fourth control unit 30d except the fifth control unit 30e and capable of synchronizing based on the inputs from the first through fourth input units 50a-50d.

The controls by the first through fifth synchronization control units 58a-58e are described next based on FIGS. 6A-6C. First, in FIG. 6A, synchronization information is input to the fifth input unit 50e to set the first control unit 30a to serve as the main control unit (marked Main) capable of independently setting the reaction condition. In addition, the second and third control units 30b and 30c are set to serve as the sub control units (marked Sub) with the reaction conditions to be synchronized with the reaction condition in the main control unit or the first control unit 38a. Next, in FIG. 6B, control information is input to the first and fourth input units 50a, 50d to control the first control unit 30a at a constant temperature of 25° C. and the fourth control unit 30d at 30° C. Then, as shown in FIG. 6C, the second and third control units 30b, 30c are not given setting temperatures and set at 25° C. in synchronization with the setting temperature at the first control unit 30a. Although synchronization of temperature setting is only exemplified in FIG. 6, synchronization of stirring speeds and reaction times may be set similarly.

The first example of the invention has been described above though the present invention is not limited to this one but rather can be given various modifications, additions and replacements without departing from the scope of the invention. For example, the reaction vessel supports 10 and the corresponding first through fourth control units 30a-30d in the organic synthesizer are not limited to four but may be five or more in number. Even the number increases, the user can use the organic synthesizer rapidly with no complicated setting work in setting identical reaction conditions. The above-described magnetic field shielding member 44 may be double-structured as shown in FIG. 7 instead of the single-structured one as shown in FIGS. 2-4. In the first example, the magnetic field shielding members 44 are provided for the associated rotary magnet units 28 though the magnetic field shielding members 44 may be arranged every other one because such the arrangement is sufficient to the influence of the magnet fields from adjacent rotary magnet units 28. Furthermore, the magnetic field shielding member 44 may be formed in a structure to shield the magnet field between adjacent magnets 34, for example, in the shape of a plate arranged between the rotary plates 32, instead of the ring-shaped structure.

Second Example

Referring to FIGS. 8-11, an organic synthesizer according to an example of a third invention and a fourth invention (hereinafter referred to as a "second example") is described.

FIG. 8 is a partly sectioned front schematic view showing the organic synthesizer according to the second example. FIG. 9 is a cross-sectional side view of a pressure-proof vessel shown in FIG. 8. The organic synthesizer according to the second example is provided for sample stirring, heating and pressure regulating in four reaction vessels to execute chemical reactions with the samples in unison. The organic synthesizer mainly comprises a reaction vessel support 62 capable of supporting four reaction vessels 60, a pressure regulating unit 64 capable of regulating pressures in the four reaction vessels 60, and a stirring unit 66 operative to stir samples in the reaction vessels 60.

The reaction vessel support 62 includes four support bodies 70 for supporting respective later-described pressure-proof vessels 68, a cover member 72 for surrounding the left, right, front and rear surfaces of these support bodies 70, and first top plates 74 arranged on the upper surface of the cover member 72 and provided split for the pressure-proof vessels 68. The support bodies 70 are composed of a raw material excellent in thermal conduction, such as aluminum, and configured to conduct heat from heating members such as heaters via the pressure-proof vessels 68 to the reaction vessels 60 contained therein. Further, the first top plates 74 are provided thereon with second top plates 74a having smaller openings than the first top plates 74 to fit in opening edges of the first top plates 74, and fixing screws 74b for fixing the first top plates 74 to the cover member 72. The cover member 72 is provided with grips 72a for gripping the cover member 72 in the vicinity of the left and right ends of the upper surface of the cover member.

The pressure regulating unit 64 includes four pressure-proof vessels 68 for housing the four reaction vessels 60 hermetically, a gas flow regulating unit (not shown) operative to supply or discharge gases in/from the reaction vessels 60 housed in the pressure-proof vessels 68 to regulate pressures in the four reaction vessels 60, and gas supply/discharge pipes 80 extending downward from four openings 78 formed through a cabinet 76 of the gas flow regulating unit and capable of connection to the pressure-proof vessels 68.

The pressure-proof vessel 68 is formed in the shape of a bottomed-cylinder with an upper opening as shown in FIG. 9 and includes a pressure-proof vessel body 82 capable of housing the reaction vessel 60 therein, and a pressure-proof vessel lid 84 capable of attachment/detachment to/from the opening in the pressure-proof vessel body 82. The pressure-proof vessel body 82 and the pressure-proof vessel lid 84 are formed of a pressure-proof material such as SUS (Steel Use Stainless). The pressure-proof vessel lid 84 is screwed around the pressure-proof vessel body 82 to close the opening. A circular shield member 82a may be interposed between the outer circumferential surface of the pressure-proof vessel body 82 and the inner circumferential surface of the pressure-proof vessel lid 84 to hermetically seal the pressure-proof vessel 68. The pressure-proof vessel lid 84 is provided with a bore 84a formed through the upper surface thereof to couple the gas supply/discharge pipe 80 tightly therein using a fixing nut 84b.

The stirring unit 66 includes, as shown in FIG. 8, a cabinet 86 for receiving the support bodies 70 thereon, rotary magnet units 88 provided at respective positions aligned with the support bodies 70 in the cabinet 86, and a stirring member 90 formed in the shape of a rod extending vertically with an upper end rotatably supported at the upper portion of the reaction vessel and a lower end immersed into the reagent within the reaction vessel and configured capable of supporting a stirrer 89 under the immersed condition.

The rotary magnet unit 88 includes, as shown in FIGS. 8 and 10, a motor 92, a disc-shaped rotary plate 94 having the center connected to the axial center of the motor 92, N-pole and S-pole magnets 96, 96 arranged at opposite positions on the rotary plate 94, and a ring member 98 of iron arranged surrounding the rotary plate 94. The rotary magnet unit is configured to rotate the magnets 96, 96 on the rotary plate 94 in accordance with rotations of the axial center of the motor 92. Such the arrangement corresponds to a drive system similar to the magnetic stirrer system of prior art.

The stirring member 90 includes, as shown in FIG. 9, a first shaft 102 fixed to a stationary portion 100b of a later-described pressure-proof vessel inner lid 100, a connection member 104 provided beneath the first shaft 102 and formed in the shape of a cylinder capable of receiving the lower end of the first shaft 102 inserted therein, a second shaft 106 coupled with the lower portion of the connection member 104 and formed capable of supporting the stirrer 89 composed of a magnetic material on the lower end, and a pair of blades 108, 108 provided on the second shaft 106.

As shown in FIG. 11, the first shaft 102 includes a threaded portion 102a having a male threaded 102a outer circumference at the upper end, a flange portion 102b radially protruding around the whole circumference at the lower end of the first shaft 102, and a first shaft body 102c formed between the threaded portion 102a and the flange portion 102b. The first shaft is composed of SUS.

The connection member 104 is formed in the shape of a cylinder with an upper end portion 104a having an inner diameter smaller than the outer diameter of the flange portion 102b but lager than the outer diameter of the first shaft body 102c, a lower end portion 104b having a female threaded inner circumference, and a middle portion 104c having an inner diameter lager than the outer diameter of the flange portion 102b. The connection member is composed of SUS.

The first shaft 102 and the connection member 104 are configured as above. Accordingly, by inserting the threaded portion 102a of the first shaft 102 into the connection member 104 from the lower end portion 104b and protruding the threaded portion 102a through the connection member 104 from the upper end portion 104a, the first shaft 102 can be connected to the connection member 104 rotatably A collar 110 is provided between the flange portion 102b of the first shaft 102 and the upper end portion 104a of the connection member 104 on connection of the first shaft 102 to the connection member 104. The collar 110 is formed in the shape of a cylinder having an inner diameter larger than the body 102c of the first shaft 102 and an outer diameter smaller than the inner diameter of the middle portion 104c of the connection member 104. The collar is composed of a resinous material excellent in heat-resisting property, chemical resistance, and abrasion resistance, for example, such as PEEK (polyether ether keton) Therefore, the collar 110 allows the first shaft 102 and the connection member 104 to achieve smoother rotations relative to each other. In addition, the collar 110 prevents the connection member 104 from dropping off the first shaft 102.

The second shaft 106 is formed in the shape of a column and composed of PTFE. The second shaft 106 has a male threaded portion 106a formed at the upper end, which is capable of screwing in the female threaded portion formed along the inner circumference of the lower end portion 104b of the connection member 104, and an insertion bore 106b formed at the lower end, into which the columnar stirrer 89 is inserted for gripping. The insertion bore 106b has a diameter formed slightly smaller than the outer diameter of the stirrer 89 such that the resilient force of PTFE configuring the second shaft 106 is used to rigidly grip the stirrer 89. A pair of blades 108, 108 are fixed at symmetrical positions about the axial center above the insertion bore 106b of the second shaft 106 using a screw 112. The blades 108, 108 are formed in the shape of rectangles with V-shaped notches 108a, 108a formed from the respective one side and portions on the respective other side are fixed using screws 112 to protrude the portions on the respective one side in different directions from the second shaft 106.

The stirring member 90 is fixed to the pressure-proof vessel 68 by fixing the first shaft 102 to the pressure-proof vessel inner lid 100 provided between the pressure-proof vessel body 82 and the pressure-proof vessel lid 84. The pressure-proof vessel inner lid 100 is attached to cover the opening in the reaction vessel 60 housed in the pressure-proof vessel body 82. The inner lid is provided with a bore 100a that is aligned with a bore 84a through the pressure-proof vessel lid 84. On the center of the inner circumferential surface of the pressure-proof vessel inner lid 100, a female threaded connection bore 100b is provided capable of screwing with the threaded portion 102a of the first shaft 102. Fastening a fixing nut 101 screwed around the threaded portion 102a makes it possible to fix the first shaft 102 to the pressure-proof vessel inner lid 100. The stirring member 90 has a length so adjusted that the stirrer 89 inserted into the insertion bore 106b and gripped cannot contact the reaction vessel 60 when the stirring member 90 is fixed to the pressure-proof vessel inner lid 100 and the pressure-proof vessel inner lid 100 is located on the reaction vessel 60.

As described above, in the organic synthesizer according to the second example, the stirrer 89 is suspended by the stirring member 90 out of contact with the reaction vessel 60, and the stirring member 90 is rotatably supported relative to the pressure-proof vessel inner lid 100. Accordingly, running the rotary magnet unit 88 makes it possible to rotate the stirrer 89 out of contact with the reaction vessel 60 to rotate the sample within the reaction vessel 60. In addition, providing the blades 108 protruding from the sides of the stirrer 89 makes it possible to achieve uniform stirring even though the sample is highly viscose or separated in multi-layers.

Alternative to Second Example

Referring next to FIGS. 12-17C, an organic synthesizer according to an alternative to the second example is described. The organic synthesizer according to the alternative to the second example of the present invention mainly, like the second example, comprises a reaction vessel support capable of supporting reaction vessels, a pressure regulating unit for regulating pressures in the reaction vessels, and a stirring unit operative to stir samples in the reaction vessels (not shown).

The alternative to the second example is different from the second example particularly in the structure of pressure-proof vessels 116 for housing reaction vessels 114 therein hermetically, and in the structure of stirring members 120 having upper ends rotatably supported at the upper portions of the reaction vessels 114 and lower ends immersed into reagents in the reaction vessels 114 and configured capable of gripping stirrers 118. The following description is given concentrating on the structures of the pressure-proof vessels 116 and the stirring members 120.

FIG. 12 is a sectioned side view of the pressure-proof vessel 116 in the organic synthesizer according to the second example. The pressure-proof vessel 116 includes, as shown in FIG. 12, a pressure-proof vessel body 122 formed in the shape of a bottomed-cylinder with an upper opening and capable of housing the reaction vessel 114 therein, and a pressure-proof vessel lid 124 detachably attachable to the opening in the pressure-proof vessel body 122. The pressure-proof vessel body 122 and the pressure-proof vessel lid 124 are formed of a pressure-proof material such as SUS. The reaction vessel 114 housed in the pressure-proof vessel body 122 is provided with a pressure-proof vessel inner lid 126 attached thereto for closing the opening. FIG. 13 is a sectioned side view of the pressure-proof vessel 116 of FIG. 12 from which the pressure-proof vessel lid 124 is removed.

The pressure-proof vessel body 122 has a recess 122a formed in the circumferential direction entirely, which is recessed outward in the radial direction from the inner circumferential surface in the vicinity of the opening. As shown in FIGS. 12-15, the recess 122a receives a hexagonal spring 128 formed in a resiliently deformable annular hexagon arranged therein. The hexagonal spring 128 is composed of stainless steel of φ≈0.3-0.7 mm and formed such that corners thereof can impinge on inner walls of the recess 122a and sides thereof can press outer walls of the reaction vessel 114 housed therein. Namely, as shown in FIG. 15, the hexagonal spring 128 is formed such that, when the reaction vessel 114 is not housed in the pressure-proof vessel body 122, the corners thereof impinge on the recess 122a and the sides thereof slightly bend inward to protrude part of the sides inward from the recess 122a.

As the hexagonal spring 128 is thus formed, when the reaction vessel 114 is housed in the pressure-proof vessel body 122 as shown in FIG. 14, the resilient deformation allows the sides of the hexagonal spring 128 to bend outward. As a result, the reaction vessel 114 is pressed by the urging force of the hexagonal spring 128 and arranged on the center of the pressure-proof vessel body 122. Variations in process steps may form a gap between the inner circumferential surface of the pressure-proof vessel body 122 and the outer circumferential surface of the reaction vessel 114. Even in such the case, the centerline of the reaction vessel 114 can be matched with the centerline of the pressure-proof vessel body 122 and with the center of rotation of the rotary magnet unit 88. Accordingly, it is possible to provide uniform sample stirring. In addition, urging the reaction vessel 114 by the hexagonal spring 128 makes it possible to fix the reaction vessel 114 to the pressure-proof vessel body 122 and prevent the reaction vessel 114 from rotating even if the stirrer 118 rotates at a higher speed.

The pressure-proof vessel lid 124 is screwed around the outer circumference of the pressure-proof vessel body 122 to close the opening thereof. A ring-shaped shield member 129 may be interposed between the outer circumferential surface of the pressure-proof vessel body 122 and the inner circumferential surface of the pressure-proof vessel lid 124 to hermetically seal the pressure-proof vessel 116. The pressure-proof vessel lid 124 is provided with bores 124a, 124a formed through the upper surface thereof to couple the gas supply/discharge pipe 80 tightly therein. Either one of these two bores 124a, 124a is fixed to the gas supply pipe 80 and the other is sealed with a plug or the like. If the pressure regulating unit is provided with a gas supply pipe and a gas discharge pipe, the two bores 124a, 124a can be used as a pressuring bore and a depressurizing bore separately.

The pressure-proof vessel inner lid 126 includes a pressure-proof vessel inner lid body 128 in the shape of a plug for closing the opening in the reaction vessel 114, and a shaft support member 130 for supporting the upper end of the stirring member rotatably.

The pressure-proof vessel inner lid body 128 includes an upper surface portion 128a in the shape of a disc having an outer diameter larger than the reaction vessel 114, and a columnar portion 128b provided beneath the upper surface portion 128a and formed in the shape of a column having an outer diameter smaller than the inner diameter of the reaction vessel 114. The upper surface portion 128a is provided with an opening 132 formed to supply a gas into the reaction vessel 114 therethrough. The columnar portion 128b is provided with a vertically passing columnar bore 134 formed at the center, and outwardly protruding, resiliently deformable projections 136, 136 formed at two upper and lower positions in the outer circumferential surface entirely in the circumferential direction. These projections 136, 136 have outer diameters formed larger than the inner diameter of the reaction vessel 114. The upper surfaces of the projections 136, 136 receive O-rings 138 composed of a resilient material such as rubber thereon. The projections 136, 136 are composed of a resin excellent in resilience, such as PTFE. The projections 136, 136 formed in the outer circumferential surface of the columnar portion 128b are designed to have the outer diameters formed larger than the inner diameter of the reaction vessel 114 in this way. Accordingly, when the pressure-proof vessel inner lid 126 is inserted through the opening in the reaction vessel 114, the projections 136, 136 bend and direct the tips thereof upward. In this case, by the resilient forces of the O-rings 138, the tips of the projections 136, 136 press the inner circumferential surface of the reaction vessel 114 to fixedly attach the pressure-proof vessel inner lid 126 to the reaction vessel 114. As a result, the pressure-proof vessel inner lid 126 can be prevented from rotating in accordance with the rotation of the stirring member 120.

A shaft support member 130 is formed in the shape of a hexagonal cylinder or circular cylinder and fixedly attached to the center of the upper surface portion 128a using a screw 140 so as to be located at the center of the bore 134 through the columnar portion 128.

The stirring member 120 mainly includes a shaft portion 142 in the shape of almost a column, and a stirrer-fixing member 144 for fixing the stirrer 118 that is inserted into an opening 142b in the shaft portion 142.

A columnar cavity portion 146 having a certain depth is formed in the upper end of the shaft portion 142. The cavity portion 146 has an inner diameter formed larger than the outer diameter of the shaft support member 130. In the vicinity of the lower end of the shaft portion 142, an opening 142b is formed laterally passing therethrough. In the outer circumferential surface above the opening 142b in the shaft portion 142, a female threaded portion 142c is formed. The stirrer-fixing member 144 is formed in the shape of a ring, which has a male threaded portion 144a formed in the inner circumferential surface capable of screwing with the female threaded portion 142c. Therefore, the stirrer-fixing member 144 is attached to a position above the opening 142b in the shaft portion 142 capable of screwing up/down in the vertical direction. For example, when it screws down from the state shown in FIG. 16 to press the stirrer 118 inserted into the opening 142b, the stirrer 118 can be fixed to the stirring member 120. Even if the inner diameter of the opening 142b is formed larger than the outer diameter of the stirrer 118, the stirrer 118 can be fixed to the stirring member 120.

The stirring member 120 is attached to the lower end of the shaft support member 130 via a ball bearing 148. Namely, a female threaded portion 146a is formed in the inner circumferential surface of the cavity portion 146 of the shaft portion 142 from the upper end to a lower position. A step 146a is formed below the female threaded portion 146 in the inner circumferential surface to reduce the inner diameter at a lower position. The inner diameter at a higher position than the step 146b of the cavity portion 146 is formed equal to the outer diameter of the ball bearing 148. Therefore, the ball bearing 148 can be located on the step 146b. When a nut 150 capable of screwing in the female threaded portion 146a and having an inner diameter formed larger than the outer diameter of the shaft support member 130 is screwed down from above the cavity portion 146, the ball bearing 148 can be sandwiched between the nut 150 and the step 146b. Then, the ball bearing 148 is attached to the lower end of the shaft support member 130 using a screw 152.

The stirring member 120 is attached to the lower end of the shaft support member 130 via the ball bearing 148 in this way. Accordingly, even though the stirring member 120 rotates at a higher speed, the stirring member 120 and so forth can be prevented from being shaved due to abrasion as low as possible. The ball bearing 148 may be a mixed bearing, which has an inner wheel and an outer wheel formed, for example, of a super engineering plastic such as PTFE, PPS (polyphenyl sulfide) or PEEK material. It also has a rolling body formed of a material such as a ceramic material (such as alumina, silicon carbide, silicon nitride, and zirconia).

The cavity portion 146 is provided in the upper end of the shaft portion 142, and the ball bearing 148 and the shaft support member 130 are located inside the cavity portion. Accordingly, even if rotations may result in shavings of the ball bearing 148 and other members, the shavings are accumulated within the cavity portion 146 in the shaft portion 142. Therefore, the shavings cannot be mixed in the solution contained in the reaction vessel 114 to cause contamination.

The second example and the alternative thereto have been described above though the present invention is not limited to these examples but rather can be given various modifications, additions and replacements without departing from the scope of the invention. For example, a stirring member 90A with rectangular blades 154 having rectangular openings as shown in FIG. 17A may be used, instead of the blades 108, in the second example. Alternatively, a stirring member 90B with trapezoidal blades 156 as shown in FIG. 17B may be used. Otherwise, a stirring member 90C with E-shaped blades 158 as shown in FIG. 17C may be used.

Third Example

Referring to FIGS. 18-24B, an organic synthesizer according to an example of a fifth and a sixth invention (hereinafter referred to as a "third example") is described. FIG. 18 is a front schematic view of the organic synthesizer according to the third example. FIG. 19 is a plan view thereof. FIG. 20 is a rear cross-sectional schematic view showing a pressure-regulating unit in the organic synthesizer according to the third example. The organic synthesizer according to the third example is provided for reagent stirring, heating and pressure regulating in four reaction vessels to achieve chemical reactions of the reagents in unison. The organic synthesizer mainly comprises a reaction vessel support 160 capable of supporting four reaction vessels, a reaction control unit 162 for controlling reaction conditions in the reaction vessels supported on the reaction vessel support 160, and a pressure-regulating unit 164 operative to regulate pressures in the reaction vessels.

The reaction vessel support 160 includes four pressure-proof vessels 166 for housing four respective reaction vessels, four support bodies 168 for supporting the respective pressure-proof vessels 166, a cover member 170 for surrounding the left, right, front and rear surfaces of these support bodies 168, and top plates 172 arranged on the upper surface of the cover member 170 and provided split for the associated pressure-proof vessels 166. The pressure-proof vessel 166 includes a pressure-proof vessel body 166a formed in the shape of a bottomed-cylinder with an upper opening and capable of housing the reaction vessel therein, and a pressure-proof vessel lid 166b capable of attachment/detachment to/from the opening in the pressure-proof vessel body 166a. The pressure-proof vessel lid 166b is used to close the opening in the pressure-proof vessel body 166a to hermetically seal the pressure-proof vessels 166. The pressure-proof vessel lid 166b has an upper surface provided with a connection portion 166c to which one of a first through a fourth gas supply/discharge pipe 174a-174d is connected. The connection portion 166c is tightly fixed to one of the first through fourth gas supply/discharge pipes 174a-174d using a fixing nut 166d. The support body 168 is composed of a material excellent in thermal conduction such as aluminum and configured to conduct heat (transmitted from a later-described heating unit) via the pressure-proof vessel 166 to the reaction vessel contained therein. The top plate 172 is provided with a fixing screw 172a for fixing the top plate 172 to the cover member 170. The upper surface of the cover member 170 in the vicinity of the left and right ends is provided with a grip portion 170a for gripping the cover member 170.

The reaction control unit 162 is provided in a housing 176 beneath the support body 168 as shown in FIG. 18 and configured to control a heating unit (not shown) operative to heat the reaction vessel via the support body 168 and the pressure-proof vessel 166, a stirring unit (not shown) provided in the housing 176 and operative to rotate a chip contained in the reaction vessel using a rotary magnet to stir a reagent in the reaction vessel, and the pressure-regulating unit 164. The housing 176 has a front surface provided with an input unit 178 for feeding a control instruction to the reaction control unit 162, and a display unit 180 operative to display the control instruction and measured information.

The pressure-regulating unit 164 is configured to supply a gas into the reaction vessel housed in the pressure-proof vessel 166 and discharge the gas from the reaction vessel to increase/decrease pressure in the reaction vessel for pressure regulation. As shown in FIGS. 18-20, the pressure-regulating unit includes a first pressure-regulating unit 164A operative to regulate pressures in two reaction vessels on the right side shown in FIG. 18, and a second pressure-regulating unit 164B configured detachably attachable to the first pressure-regulating unit 164A and operative to regulate pressures in two reaction vessels on the left side shown in FIG. 18. These first and second pressure-regulating units 164A and 164B are provided in a first and a second cabinet 182A and 182B and in a first and a second cabinet 182A and 182B. They include a first and a second gas control unit 184A and 184B operative to control gases supplied into and discharged from the reaction vessels, and a first through a fourth gas supply/discharge pipes 174a-174d for connecting the first and second gas control units 184A and 184B with four reaction vessels. The first cabinet 182A is formed L-shaped seen from the rear as shown in FIG. 20. The second cabinet 182B is formed to fit in a corner of the L-shape of the first cabinet 182A to configure a front square together with the first cabinet 182A. The second cabinet 182B is configured such that it can be fixed to the first cabinet 182A using a fixing member, not shown, such as a screw.

The first gas control unit 184A includes a hydrogen gas introduction inlet 186A for introducing a hydrogen gas, and a nitrogen gas introduction inlet 186B for introducing a nitrogen gas (on the lower left side in FIG. 20). The hydrogen gas introduction inlet 186A and the nitrogen gas introduction inlet 186B are connected via a first and a second pipe 188a and 188b, respectively, to a trifurcated three-way valve 189. The three-way valve 189 is connected via a third pipe 188c to a first trifurcated branching portion 190a. One end of the first branching portion 190a is connected via a fourth pipe 188d to a second branching portion 190b. One end of the second branching portion 190b is connected via a fifth pipe 188e to a third tetra-furcated branching portion 190c. Another end of the second branching portion 190b is connected via a sixth pipe 188f to a fourth tetra-furcated branching portion 190d. The fifth and sixth pipes 188e and 188f are provided with a first and a second gas introduction valve 192a and 192b, respectively.

One end of the third branching portion 190c is connected via a seventh pipe 188g to the first gas supply/discharge pipe 174a. One end of the fourth branching portion 190d is connected via an eighth pipe 188h to the second gas supply/discharge pipe 174b. The seventh and eighth pipes 188g and 188h form helical portions 196a and 196b in the shape of helixes in the vicinity of openings 194a and 194b in the first cabinet 182A as shown in FIGS. 18-20. Another end of the third branching portion 190c is connected via a ninth pipe 188i to a merging portion 198. Another end of the fourth branching portion 190d is connected via a tenth pipe 188j to the merging portion 198 similarly. The ninth and tenth pipes 188i and 188j are provided with a first and a second discharge valve 200a and 200h. The merging portion 198 is connected via an eleventh pipe 188k to a fifth branching portion 190e. One end of the fifth branching portion 190e is connected via a twelfth pipe 188l to a gas discharge outlet 202.

A further end of the third branching portion 190c is connected via a thirteenth pipe 188m to a first pressure escape exit 204A. A further end of the fourth branching portion 190d is connected via a fourteenth pipe 188n to a second pressure escape exit 204B as well. The thirteenth and fourteenth pipe 188m and 188n are provided with a first and a second pressure escape valve 206a and 206b, respectively. Between the first and second pressure escape valves 206a and 206b and the third and fourth branching portions 190c and 190d, a first and a second pressure gauge 208a and 208b are provided, respectively.

Another end of the first branching portion 190a is connected via a fifteenth pipe 188o to a first gas introduction coupler 210a. Another end of the fifth branching portion 190e is connected via a sixteenth pipe 188p to a first discharge coupler 210b. The fifteenth and sixteenth pipes 188o and 188p are provided with a first and a second connection valve 212a and 212b.

The second gas control unit 184B comprises a second gas introduction coupler 210'a capable of coupling to the first gas introduction coupler 210a as corresponding to the hydrogen gas introduction inlet 186A and the nitrogen gas introduction inlet 186B in the first gas control unit 184A, a second gas discharge coupler 210'b capable of coupling to the first gas discharge coupler 210b as corresponding to the gas discharge outlet 202 in the first gas control unit 184A, and a first and a second pressure escape exits 204'A and 204'B as corresponding to the first and second pressure escape exits 204A and 204B in the first gas control unit 184A. In addition, as corresponding to the fourth through eleventh pipes 188d-188k, the thirteenth and fourteenth pipes 188m and 188n, the second through fourth branching portions 190b-190d, the merging portion 198, the first and second gas introduction valves 192a and 192b, the first and second gas discharge valves 200a and 200b, the first and second pressure escape valves 206a and 206b, and the first and second pressure gauges 208a and 208b in the first gas control unit 184A, the second gas control unit 184B comprises a fourth through an eleventh pipe 188'd-188'k, a thirteenth and a fourteenth pipe 188'm and 188'n, a second through a fourth branching portion 190'b-190'd, a merging portion 198', a first and a second gas introduction valve 192'a and 192'b, a first and a second gas discharge valve 200'a and 200'b, a first and a second pressure escape valve 206'a and 206'b, and a first and a second pressure gauge 208'a and 208'b. The fourth pipe 188'd is connected to a second gas introduction coupler 210'a, and the eleventh pipe 188'k to a second gas discharge coupler 210'b. The seventh pipe 188'g is connected to the third gas supply/discharge pipe 174c, and the eighth pipe 188'h to the fourth gas supply/discharge pipe 174d. The seventh and eighth pipes 188'g and 188'h form, as shown in FIGS. 18-20, helical portions 196c and 196d in the shape of helixes in the vicinity of the openings 194c and 194d in the second cabinet 182b as described later.

The second gas introduction coupler 210'a and the second gas discharge coupler 210'b have respective tips configured to protrude through the bottom of the second cabinet 182B into the corresponding positions on the L-shape of the first cabinet 182A and couple with the first gas introduction coupler 210a and the first gas discharge coupler 210b. In the organic synthesizer according to the third example, the elements in the first gas control unit 184A and the second gas control unit 184B, such as the first through nineteenth pipes 188a-188p, are formed of a pressure-proof material such as SUS.

In the above arrangement, with the second pressure-regulating unit 164B attached to the first pressure-regulating unit 164A, the interior of the reaction vessel can be pressurized or depressurized as follows. First, the first gas introduction coupler 210a is coupled with the second gas introduction coupler 210'a and the first gas discharge coupler 210b with the second gas discharge coupler 210'b, thereby connecting the second pressure-regulating unit 164B to the first pressure-regulating unit 164A. Then, it is required to open the first and second connection valves 212a and 212b. In pressurizing the interior of the reaction vessel, the first and second gas introduction valves 192a, 192b, 192'a and 192'b are opened and the first and second gas discharge valves 200a, 200b, 200'a and 200'b are closed in the first and second pressure-regulating units 164A and 164B. As a result, the interior of the reaction vessel can be pressurized. In this pressurized state, if a pressure equal to or higher than a certain value is applied, the pressure opens the first and second pressure escape valves 206a, 206b, 206'a and 206'b and prevents excessive pressure supply from damaging to the pipes and valves. On the other hand, in depressurizing the gas in the reaction vessel from the pressurized state, the first and second gas introduction valves 192a, 192b, 192'a and 192'b are closed and the first and second gas discharge valves 200a, 200b, 200'a and 200'b are opened.

As shown in FIG. 21, the second pressure-regulating unit 164B can be removed by closing the first and second connection valves 212a, 212b, and then removing the first gas introduction coupler 210a and the first gas discharge coupler 210b from the second gas introduction coupler 210'a and the second gas discharge coupler 210'b.

After the second pressure-regulating unit 164B is removed, pressure can be regulated through the above operation, only in the reaction vessel in which pressure is regulated with the first pressure-regulating unit 164A. Namely, after the second pressure-regulating unit 164B is removed as shown in FIGS. 21-23, an atmospheric reaction is executed in the reaction vessel from which the second pressure-regulating unit 164B is removed. In this case, pressure can be regulated only with the first pressure-regulating unit 164A. When the atmospheric reaction is executed after the second pressure-regulating unit 164B is removed, an atmospheric vessel 214 is used instead of the pressure-proof vessel 166. In this case, there are provided above the atmospheric vessel 214, a returning block 216 for cooling the vaporized substance in the atmospheric vessel 214 back to the liquid again (provided beneath the top plate 172), and a reagent adder 218 for adding a reagent into the reaction vessel.

On the other hand, above the top plate 172 of the reaction vessel support 160 in the front of the first and second cabinets 182A and 182B, four openings 194a-194d are formed in inverted L-shapes corresponding to the reaction vessels to be supported. These openings 194a-194d are formed in inverted L-shapes with first openings $194a_1$-$194d_1$ extending in the vertical direction, as shown in FIG. 18, second openings $194a_2$-$194d_2$ extending to the left from the upper ends of the first openings $194a_1$-$194d_1$, and third openings $194a_3$-$194d_3$ slightly extending downward from the left ends of the second openings $194a_2$-$194d_2$. The third openings $194a_3$-$194d_3$ are formed at positions that cannot overlap the vertical axis of the pressure-proof vessel 166 with the reaction vessel contained therein. The tips of the seventh and eighth pipes 188g, 188h, 188'g and 188'h, farther than the helical portions 196a-196d, extend from the openings 194a-194d to the outside of the first and second cabinets 182A and 182B and connect to the first through fourth gas supply/discharge pipes 174a-174d outside the first and second cabinets 182A and 182B. Namely, as shown in FIGS. 18 and 19, the seventh and eighth pipes 188g, 188h, 188'g and 188'h extend from beneath to the highest positions above the openings 194a-194d, then extend downward from the highest positions to form the helical portions 196a-196d, and reach lower positions than the second openings $194a_2$-$194d_2$ of the openings 194a-194d. Thereafter, the pipes extend from the openings 194a-194d to the outside, then bend downward in the vertical direction, and finally connect to the first through fourth gas supply/discharge pipes 174a-174d.

With such the arrangement, in the organic synthesizer according to the third example, in removal of the reaction vessel, first, as shown in FIG. 24A, the gas supply/discharge pipes 174a-174d located in the first openings $194a_1$-$194d_1$ are displaced upward along the first openings $194a_1$-$194d_1$ against the spring forces of the respective helical portions 196a-196d, and then displaced to the left along the second openings $194a_2$-$194d_2$. When the gas supply/discharge pipes 174a-174d reach the left ends of the second openings $194a_2$-$194d_2$, they move downward along the third openings $194a_3$-$194d_3$ by the recovery forces of the respective helical portions 196a-196d as in FIG. 24B, and stay on the positions at the lower end of the third openings $194a_3$-$194d_3$. The positions at the lower end of the third openings $194a_3$-$194d_3$ where the gas supply/discharge pipes 174a-174d stay are positions that cannot overlap the vertical axis of the pressure-proof vessel 166 with the reaction vessel contained therein. Accordingly, attachment and detachment of the pressure-proof vessel 166 can be executed smoothly. In this case, the seventh and eighth pipes 188g, 188h, 188'g and 188'h form the helical portions 196a-196d. Accordingly, stresses associated with longitudinal and lateral distortions, caused when the first through fourth gas supply/discharge pipes 174a-174d are removed from pressure-proof vessel 166, can be absorbed by the helical portions 196a-196d of the seventh and eighth pipes 188g, 188h, 188'g and 188'h. Therefore, on attachment/detachment of the reaction vessels to/from the organic synthesizer, first, the user is allowed to hold the first through fourth gas supply/discharge pipes 174a-174d and easily displace them along the shapes of the openings 194a-194d. The movement cannot impose any load on the first through fourth gas supply/discharge pipes 174a-174d and the associated fixing parts.

First Alternative to Third Example

An organic synthesizer according to a first alternative to the third example is described next based on FIGS. 25 and 26. The organic synthesizer according to the first alternative to the third example uses two different types of pipes in gas supply and gas discharge, as shown in FIG. 25, instead of the first through fourth gas supply/discharge pipes 174a-174d. Namely, the organic synthesizer according to the first alternative to the third example includes a first through a fourth gas supply pipe 174a'-174d' led from openings 194a'-194d' formed through a first and a second cabinet 182A' and 182B' for execution of gas supply, and a first through a fourth gas discharge pipe 174a"-174d" led from openings 194a"-194d" formed above, for execution of gas discharge. A pressure-proof vessel 166' includes a pressure-proof vessel lid 166b', which has two connection portions 166c', 166c' capable of connecting to the first through fourth gas supply pipes 174a'-174d' and to the first through fourth gas discharge pipes 174a"-174d", respectively. The two connection portions 166c', 166c' are tightly fixed to the first through fourth gas supply pipes 174a'-174d' and to the first through fourth gas discharge pipes 174a"-174d" using fixing nuts 166d', 166d'.

The above-described first through fourth gas supply pipes 174a'-174d' and the first through fourth gas discharge pipes 174a"-174d" are connected to a first and a second control unit 184'A and 184'B provided in the first and second cabinets 182'A and 182'B as shown in FIG. 26. Namely, third and fourth branching portions 190c and 190d, 190'c and 190'd are connected to seventeenth and eighteenth pipes 188q and 188r, 188q' and 188r' having helical portions 196a'-196d' instead of the sixth and seventh pipes 188g, 188h, 188'g and 188'h, and connected to the first through fourth gas supply pipes 174a'-174d' via the seventeenth and eighteenth pipes 188q and 188r, 188q' and 188r'. On the other hand, merging portions 198 and 198' are connected to nineteenth and twentieth pipes 188s and 188t, 188s' and 188t' having helical portions 196a"-196d" instead of the ninth and tenth pipes 188i, 188j, 188'i and 188'j, and connected to the first through fourth gas discharge pipes 174a"-174d" via the nineteenth and twentieth pipes 188s and 188t, 188s' and 188t'. Between the helical portions 196a"-196d" and the merging portions 198 and 198', first and second gas discharge valves 200a and 200b, 200'a and 200'b are provided. Except for the above arrangement, the first and second gas control units 184'A and 184' B are configured similar to the first and second gas control units 184A and 184B in the third example. In addition, the reaction vessel support 10 and the reaction control unit 12 are also similar to those in the first example.

Second Alternative to Third Example

An organic synthesizer according to a second alternative to the third example is described next based on FIGS. 27A and 27B. As shown in FIG. 27A, the organic synthesizer according to the second alternative to the third example includes rectangular openings 220a-220d and rotatable L-shaped hooks 222a-222d, instead of the inverted L-shaped openings 194a-194d, for supporting the first through fourth gas supply/discharge pipes 174a-174d, different from the third example. In such the arrangement, it is possible to shift the first through fourth gas supply/discharge pipes 174a-174d to the left side above the rectangular openings 220a-220d, as from the state of FIG. 27A to the state shown in FIG. 27B, and then hook the pipes on hooks 222a-222d, thereby leaving the pipes in place. Namely, the organic synthesizer according to the second alternative to the third example can move upward from the position connected to the pressure-proof vessel 166, and move from that position either to the left or right to a position shifted from the vertical axis of the pressure-proof vessel 166, thereby exerting the same effect as the third example Also in the arrangement of the first alternative to the third example, the rectangular openings 220a-220d and the hooks 222a-222d can be used.

Figure 1:
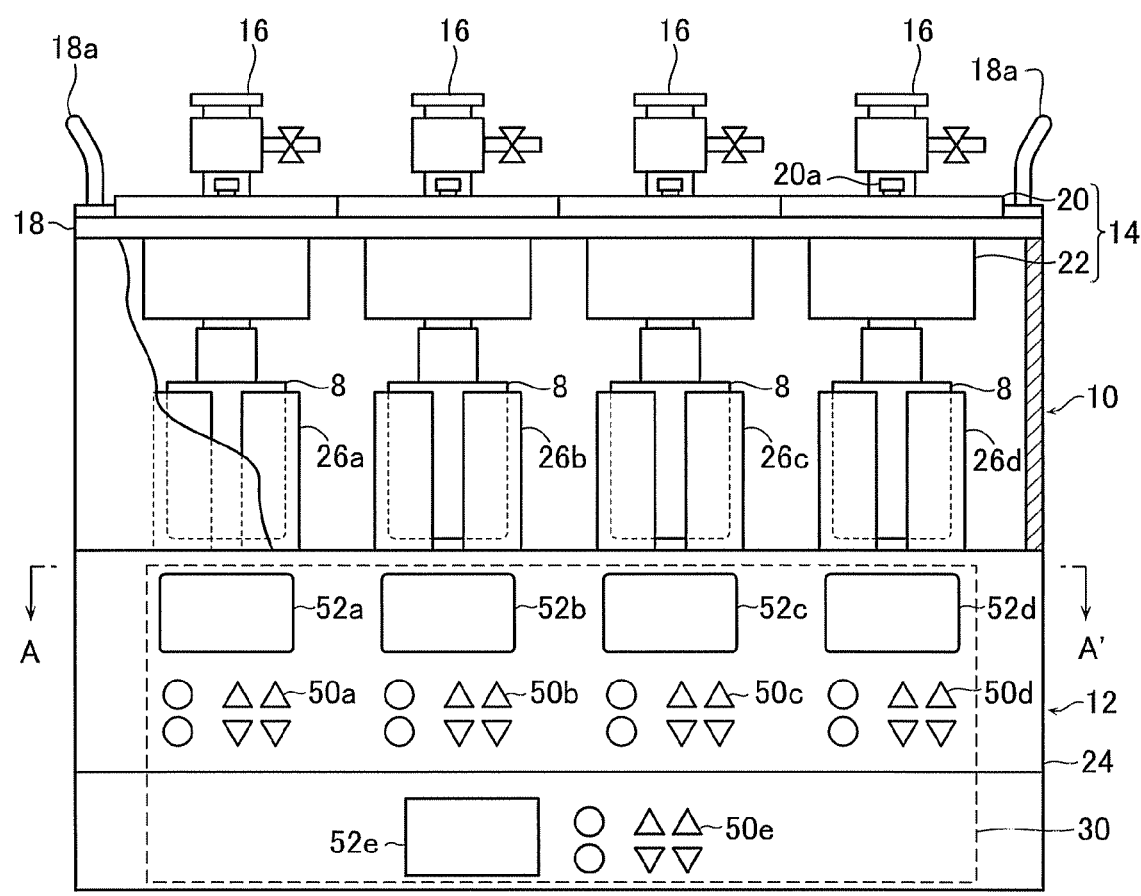
FIG. 1 A front schematic view showing an organic synthesizer according to a first example of the present invention in use.
Figure 2:
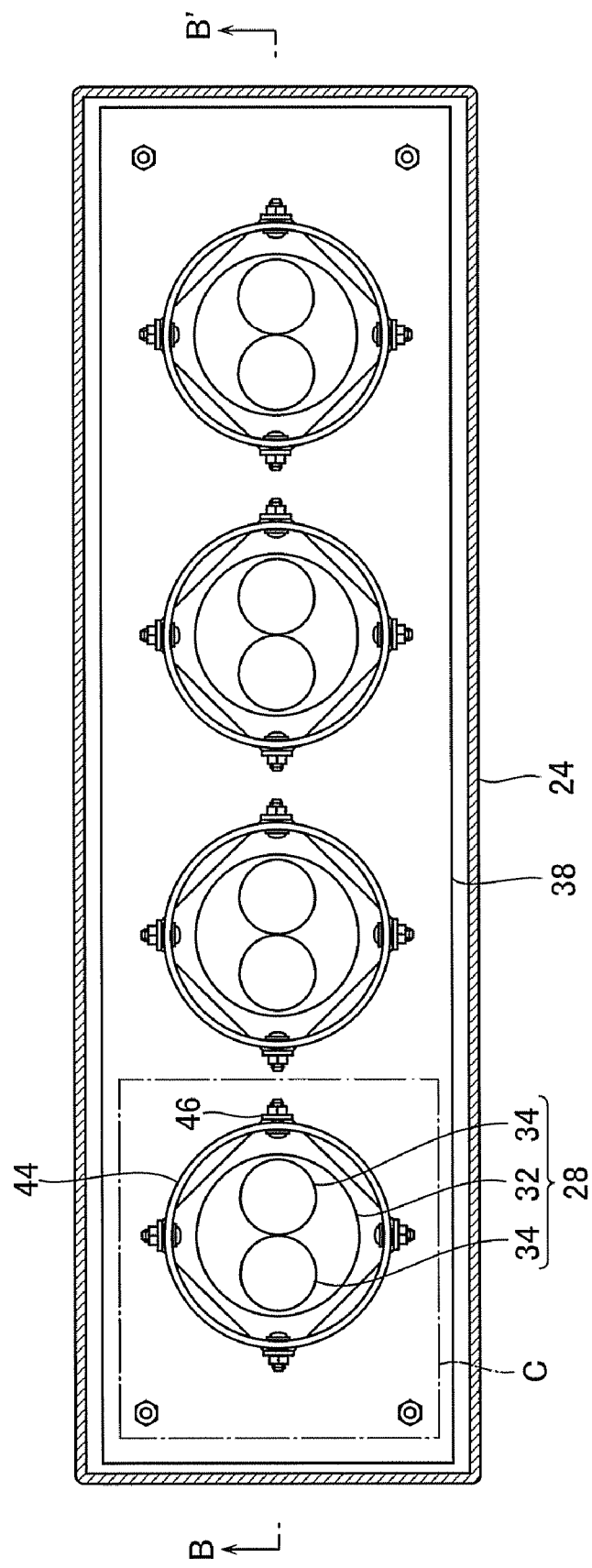
FIG. 2 A cross-sectional view of a stirring unit in the organic synthesizer according to the first example of the present invention taken along A-A' in FIG. 1.
Figure 3:
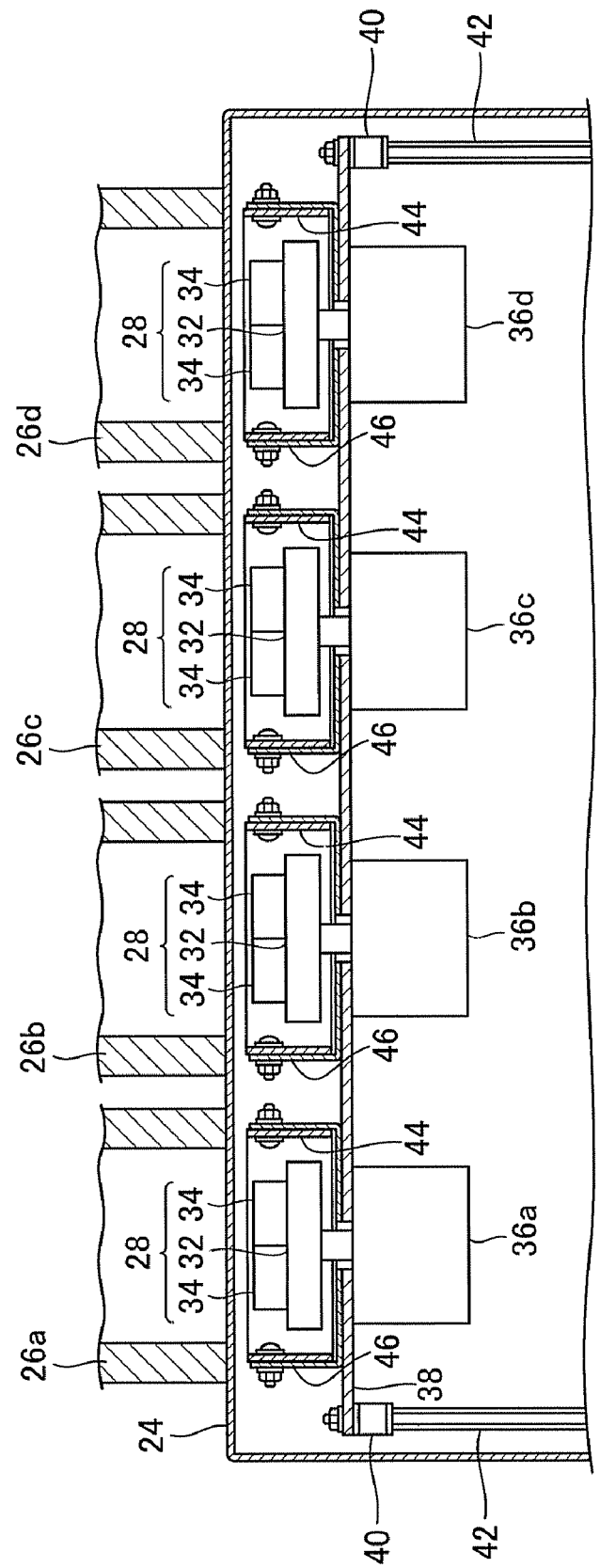
FIG. 3 A cross-sectional view of a stirring unit of the organic synthesizer according to the first example of the present invention taken along B-B' in FIG. 2.
Figure 4:
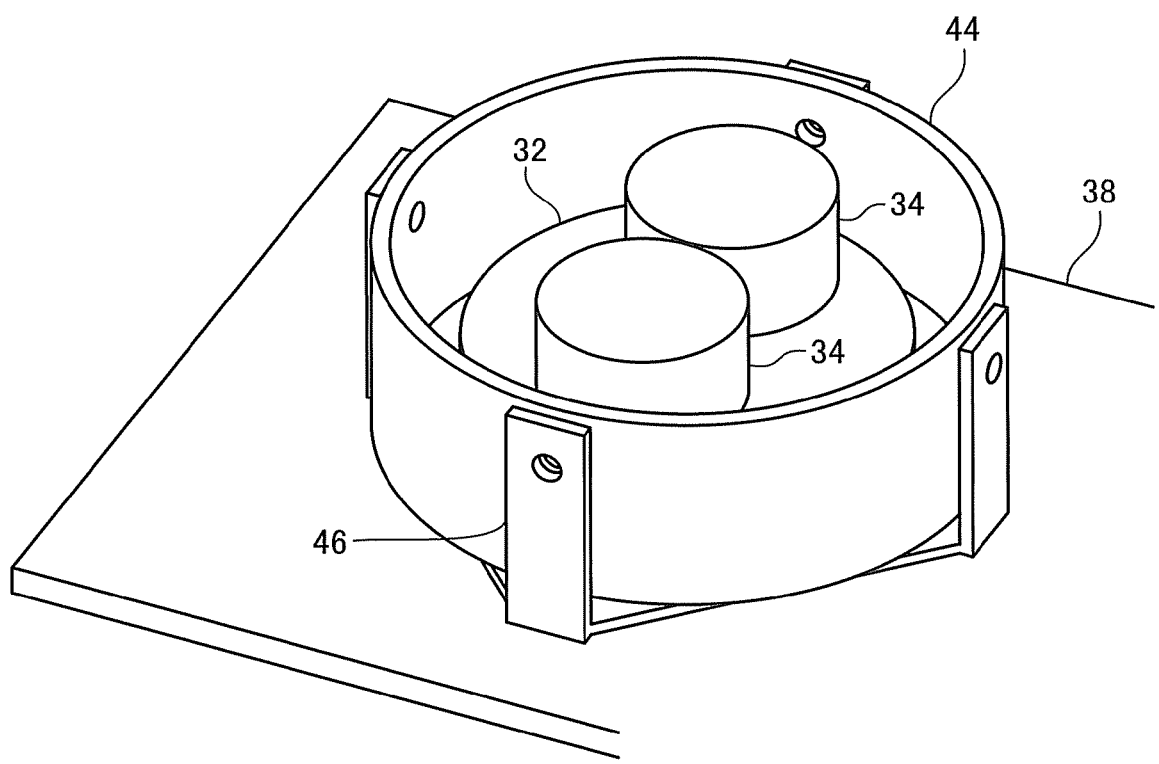
FIG. 4 An enlarged perspective view of C part in FIG. 2.
Figure 5:
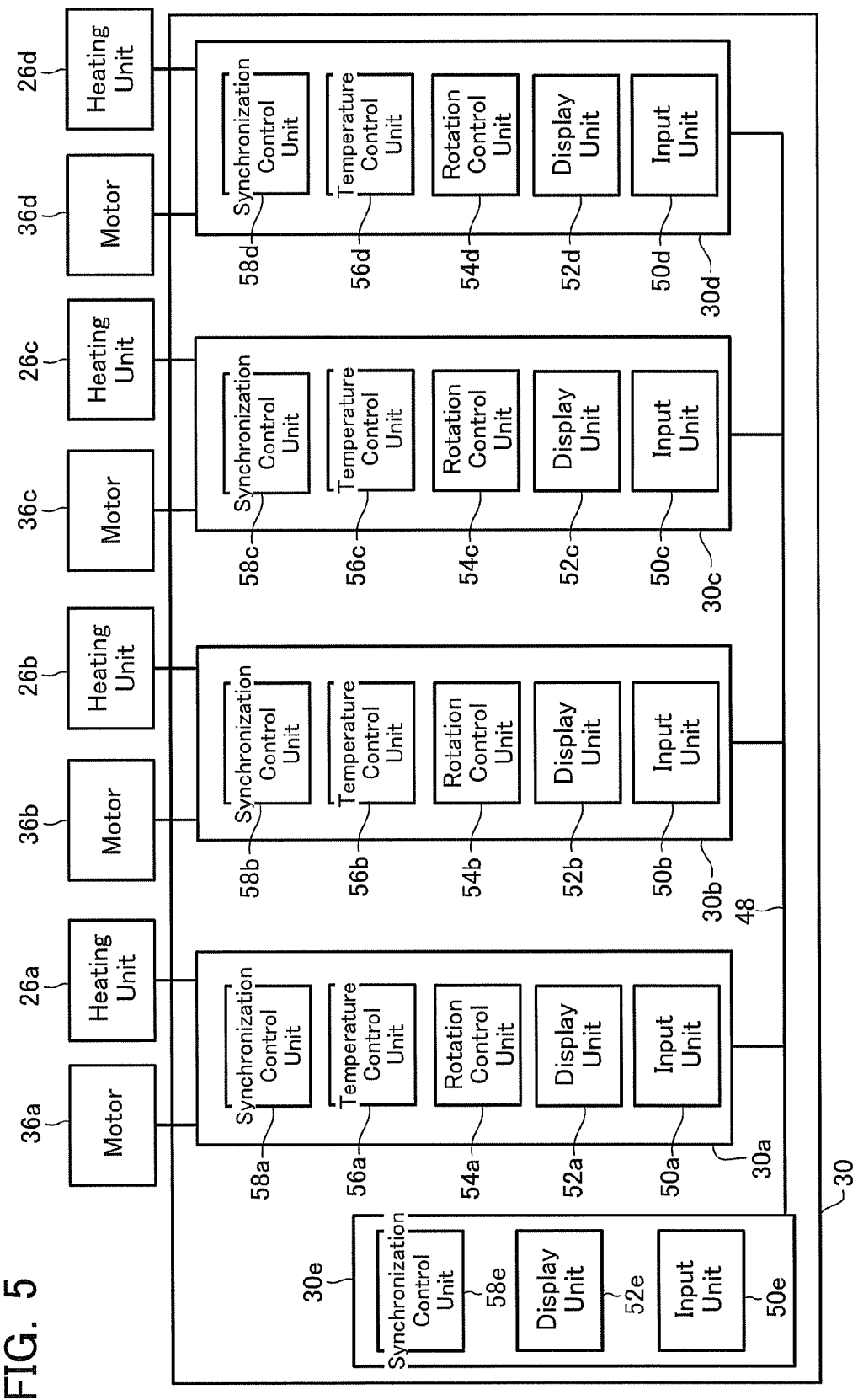
FIG. 5 A functional block diagram of the organic synthesizer according to the first example of the present invention.
Figure 6A:
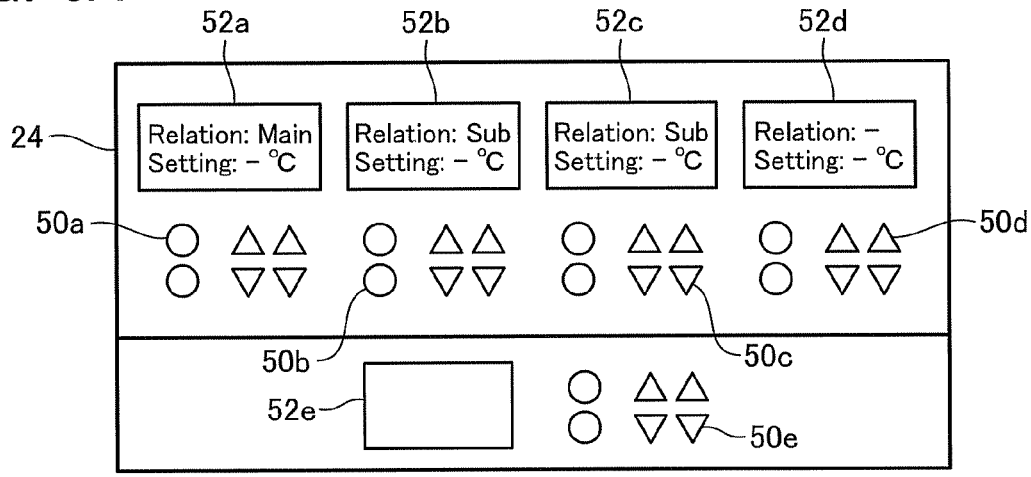
FIG. 6A A diagram showing a control example in the organic synthesizer according to the first example of the present invention.
Figure 6B:
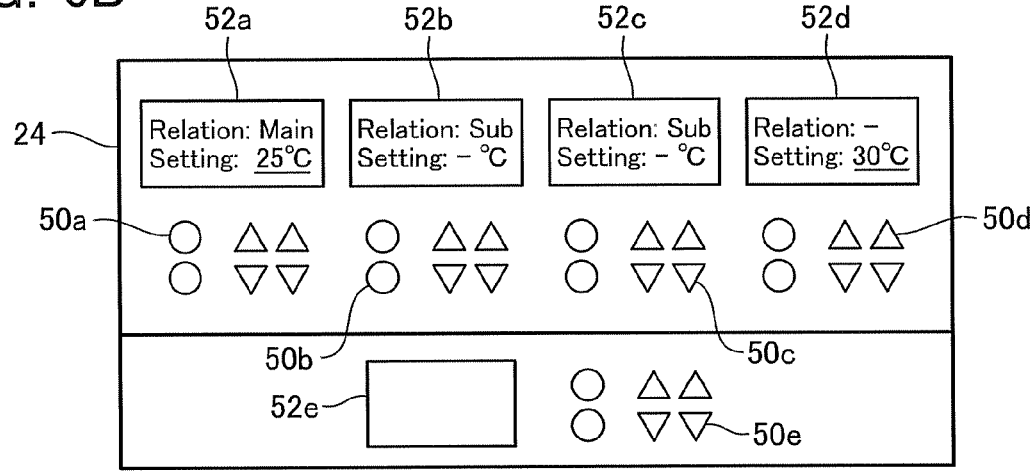
FIG. 6B A diagram showing a control example in the organic synthesizer according to the first example of the present invention.
Figure 6C:
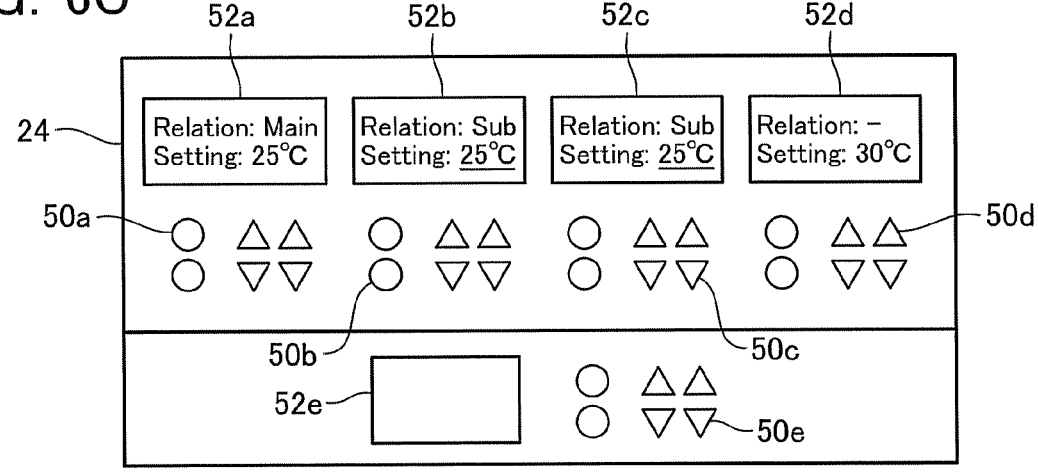
FIG. 6C A diagram showing a control example in the organic synthesizer according to the first example of the present invention.
Figure 7:
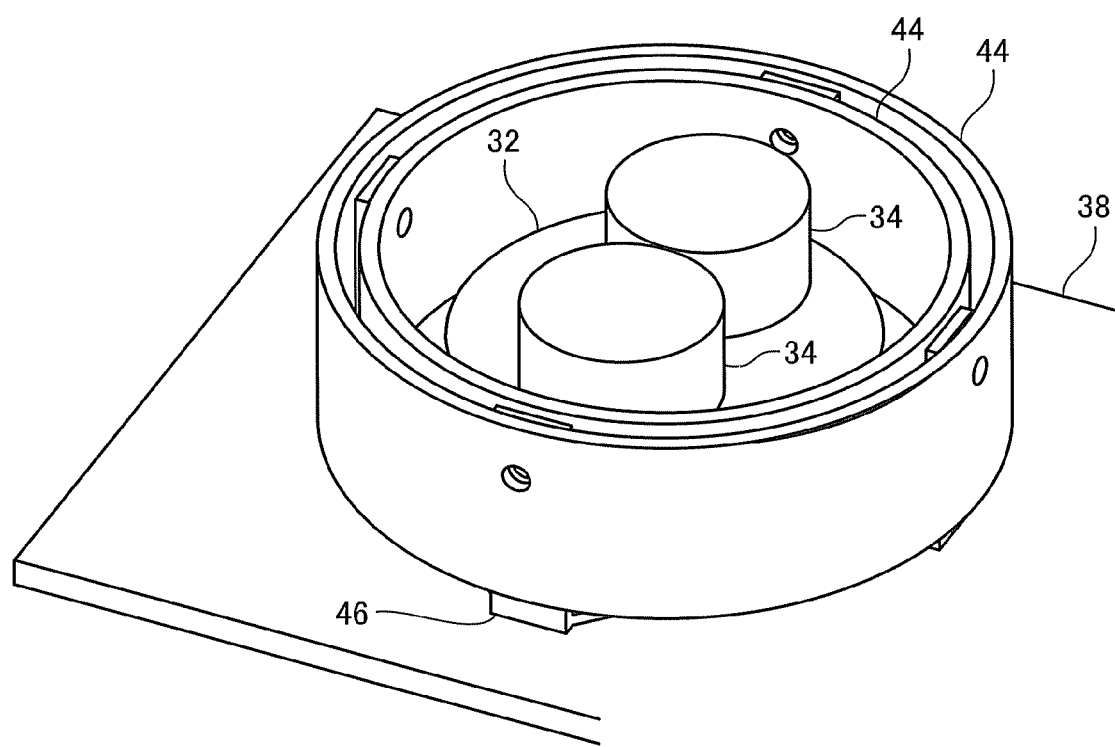
FIG. 7 An enlarged perspective view of a rotary magnet unit in the organic synthesizer according to the first example of the present invention.
Figure 8:
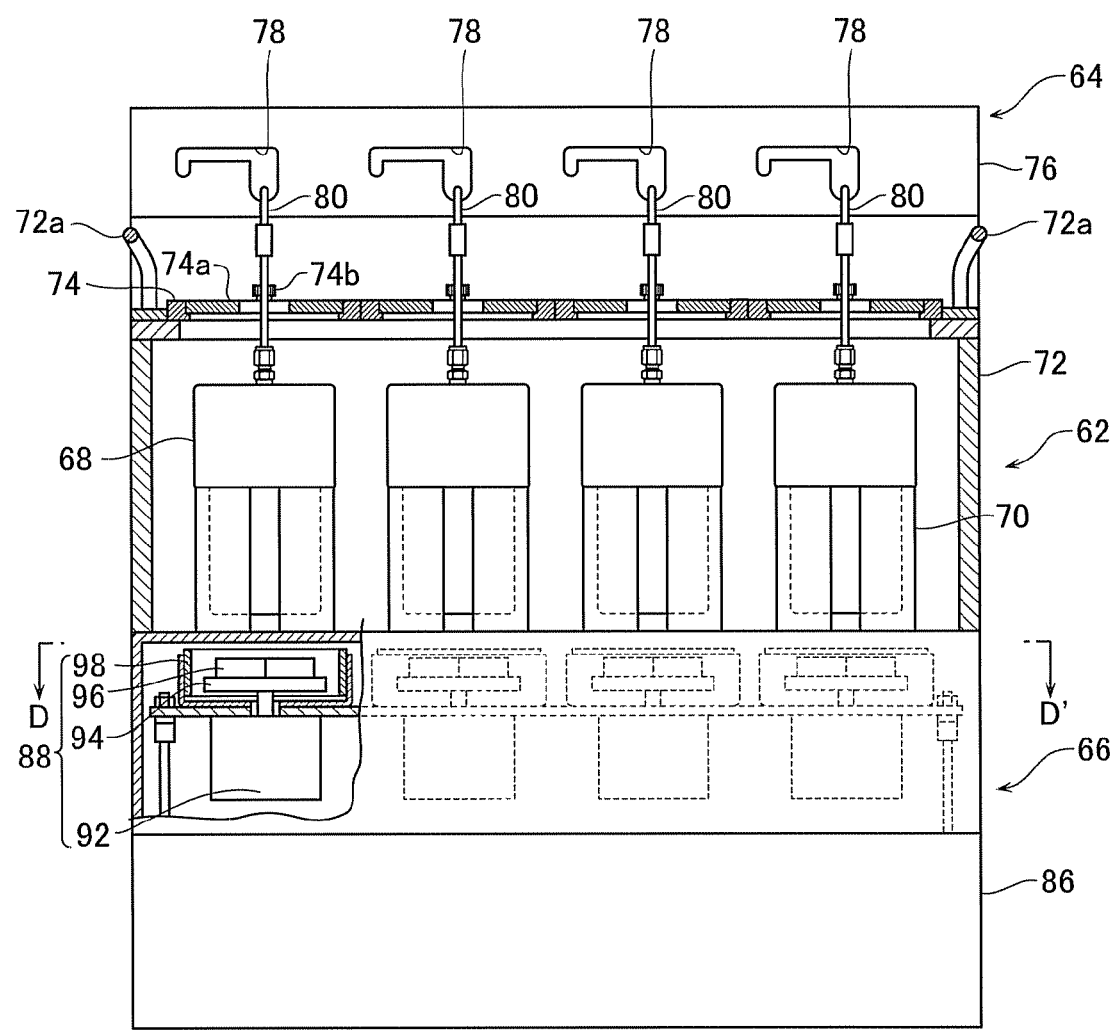
FIG. 8 A sectioned front view of an organic synthesizer according to a second example of the present invention.
Figure 9:
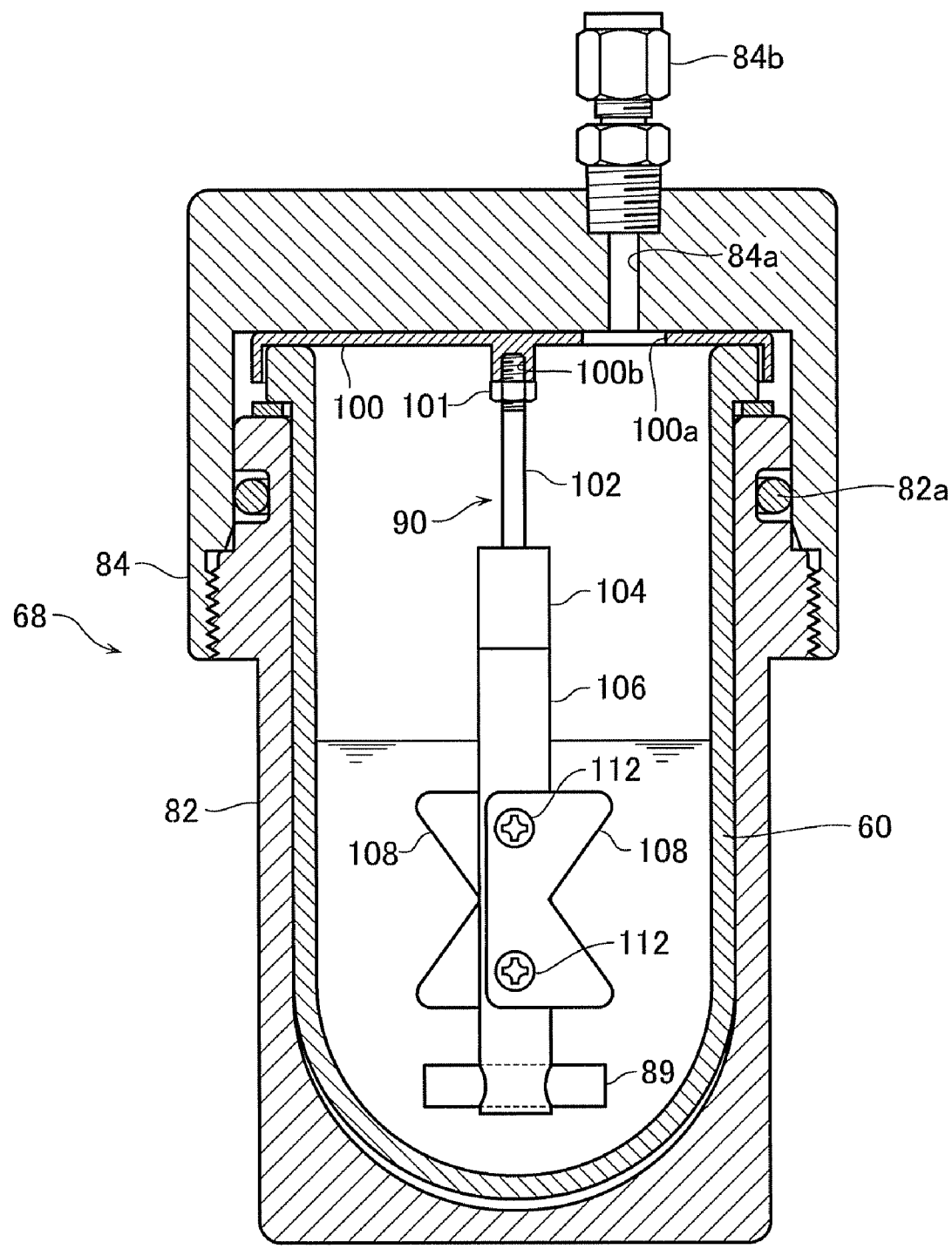
FIG. 9 A sectioned side view of a pressure-proof vessel shown in FIG. 8 in the organic synthesizer according to the second example of the present invention.
Figure 10:
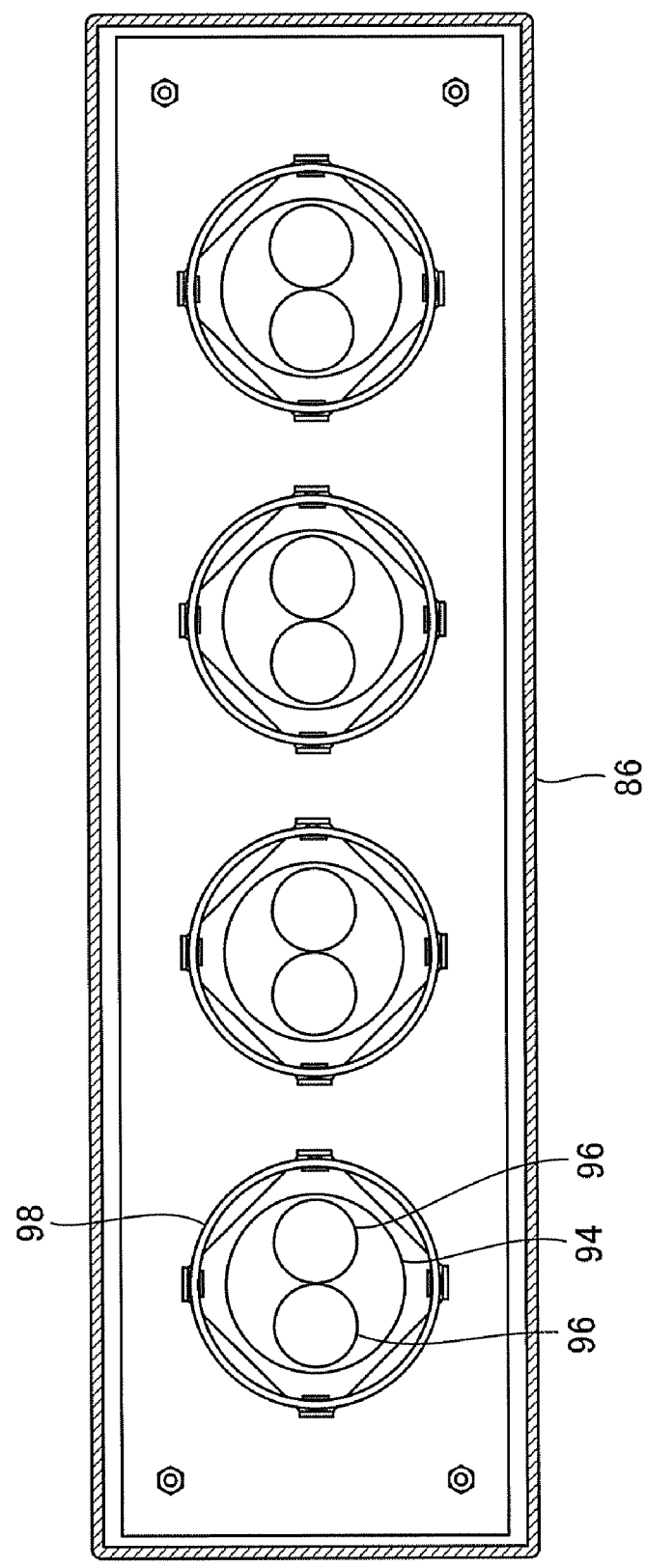
FIG. 10 A cross-sectional view of the organic synthesizer according to the second example of the present invention taken along D-D' in FIG. 8.
Figure 11:
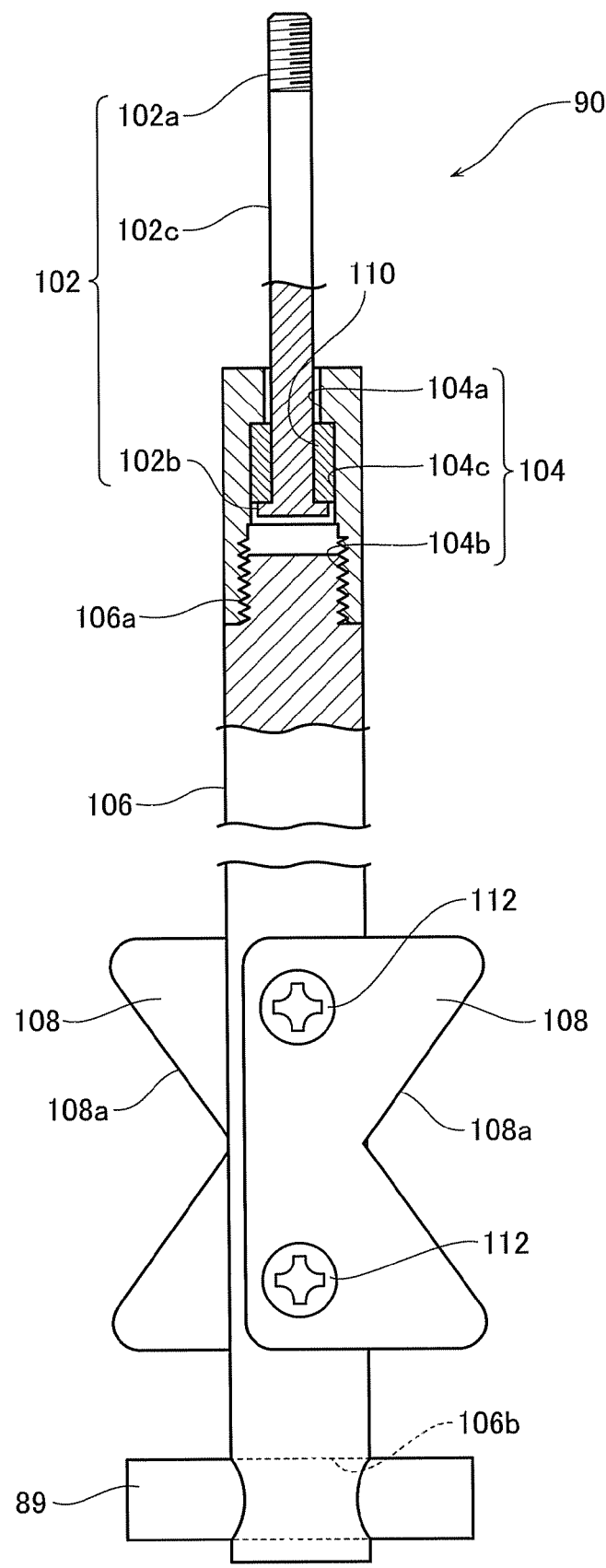
FIG. 11 A partly sectioned front view of a stirring unit shown in FIG. 9 in the organic synthesizer according to the second example of the present invention.
Figure 12:
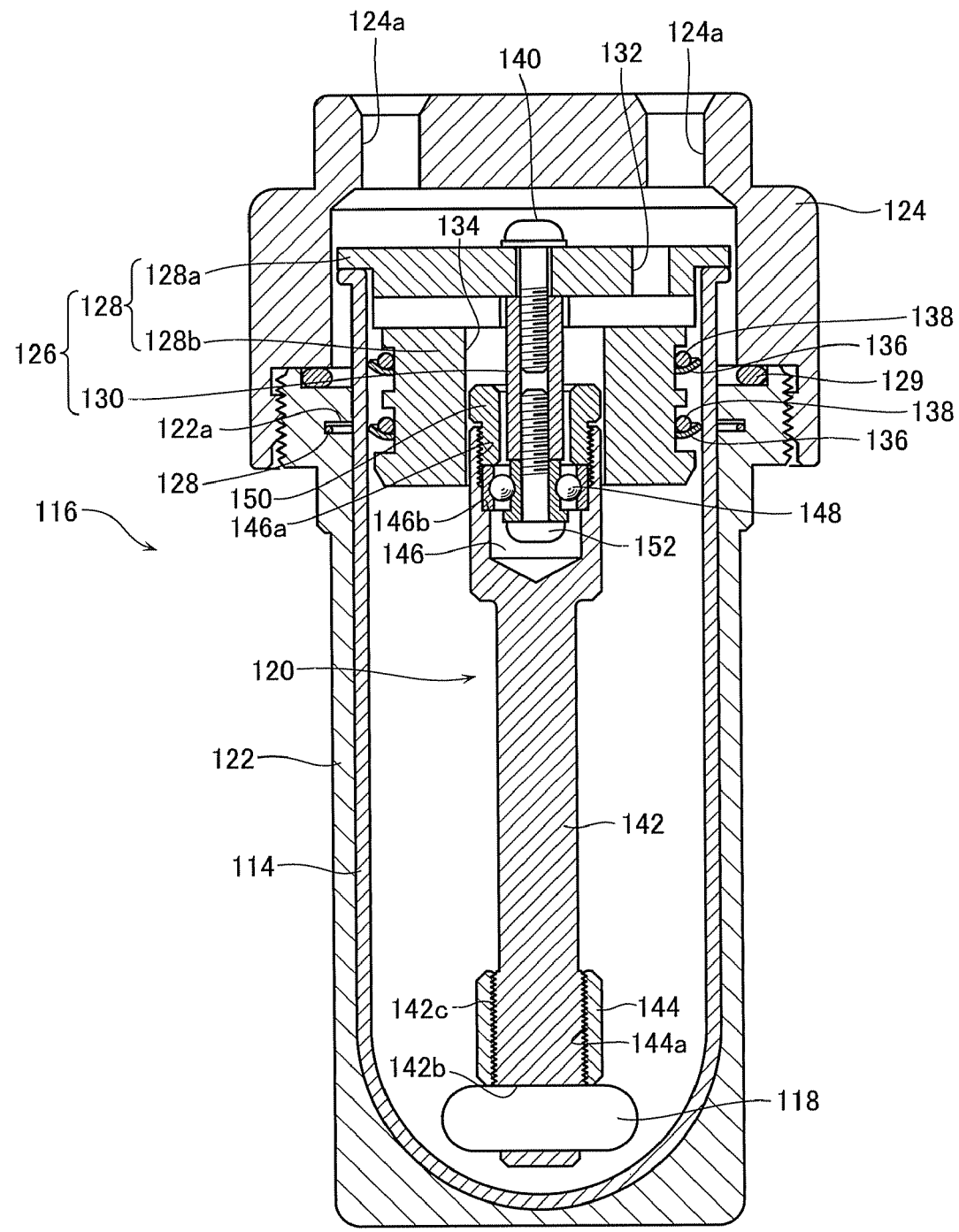
FIG. 12 A sectioned side view of a pressure-proof vessel in an organic synthesizer according to an alternative to the second example of the present invention.
Figure 13:
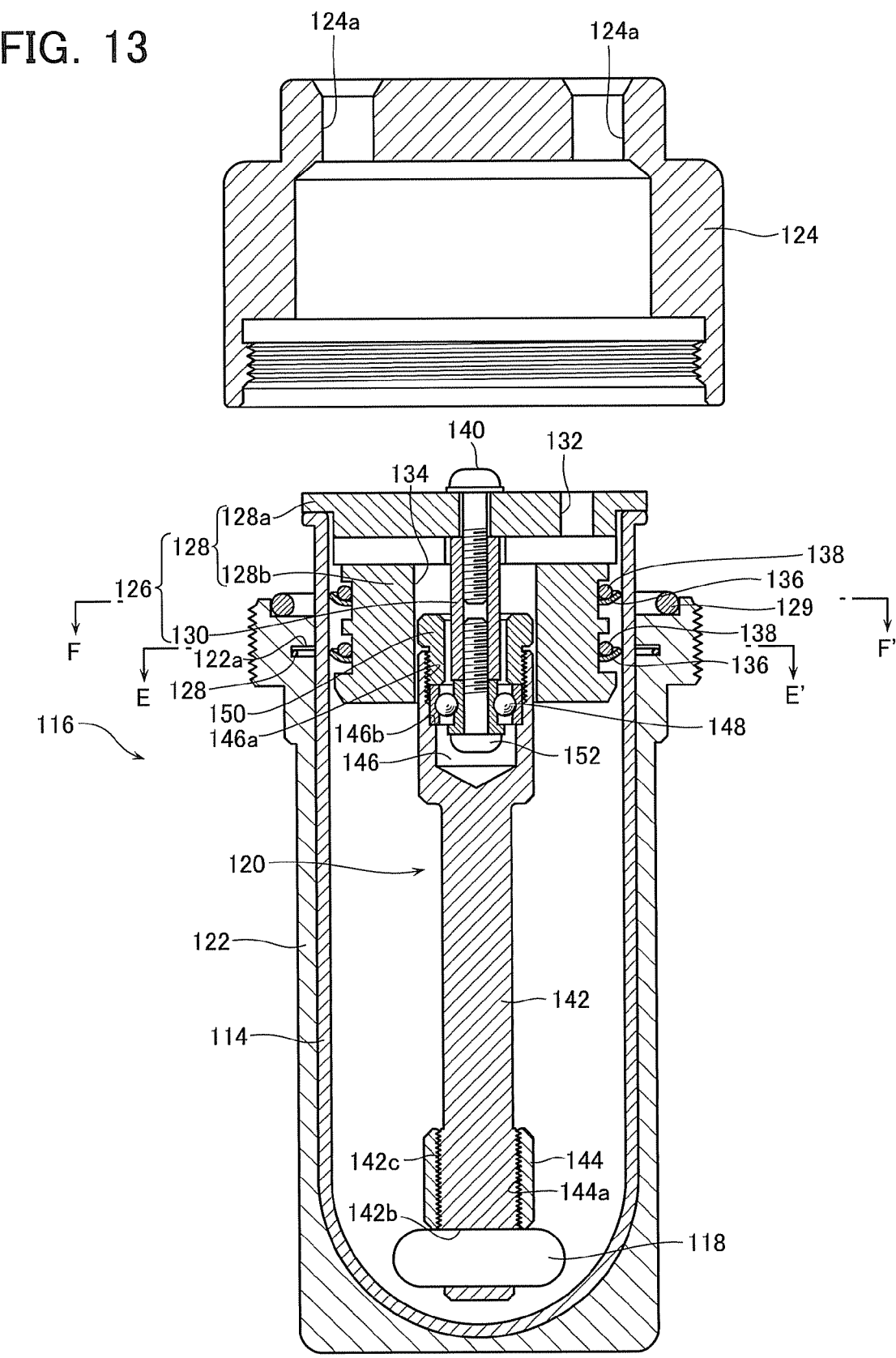
FIG. 13 A sectioned side view of the pressure-proof vessel in the organic synthesizer according to the alternative to the second example of the present invention, from which a pressure-proof vessel lid is removed.
Figure 14:
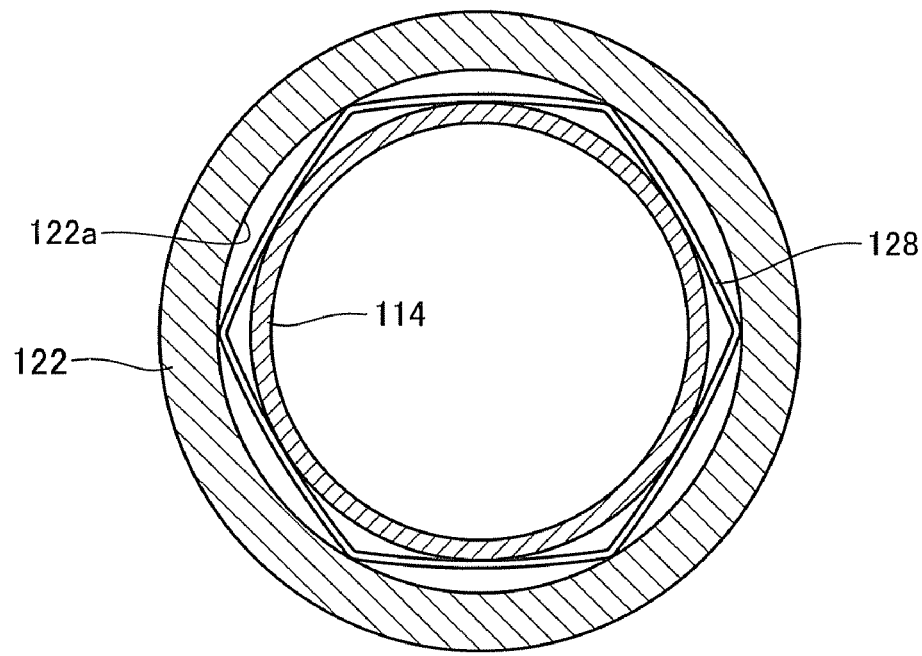
FIG. 14 A cross-sectional view of the organic synthesizer according to the alternative to the second example of the present invention taken along E-E' in FIG. 13.
Figure 15:
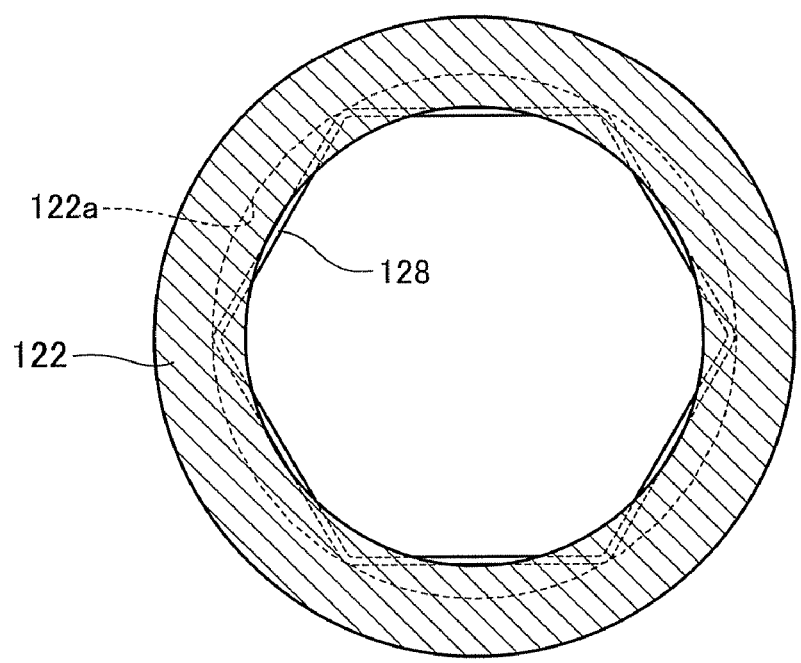
FIG. 15 A cross-sectional view of the organic synthesizer according to the alternative to the second example of the present invention taken along F-F' in FIG. 13, from which a reaction vessel is drawn.
Figure 16:
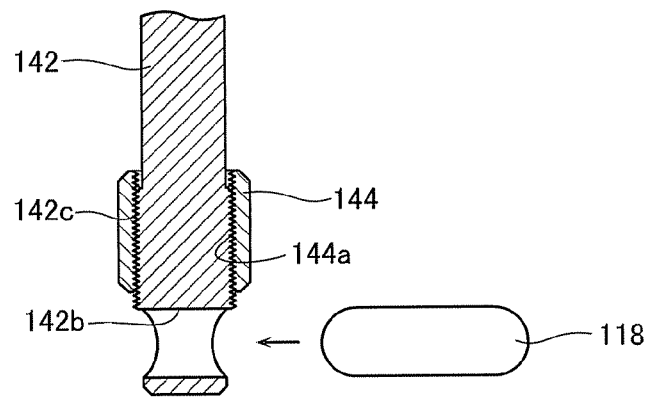
FIG. 16 An enlarged cross-sectional view of the major part of the organic synthesizer according to the alternative to the second example of the present invention, in which a stirrer is removed from a shaft.
Figure 17A:
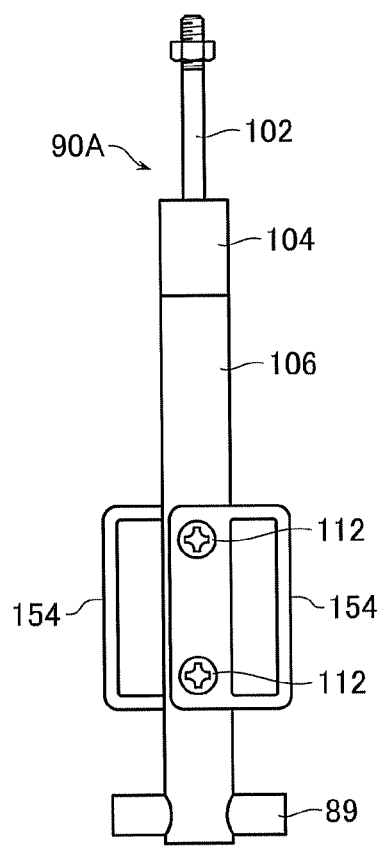
FIG. 17A A front view showing a stirring member according to another alternative to the second example of the present invention.
Figure 17B:
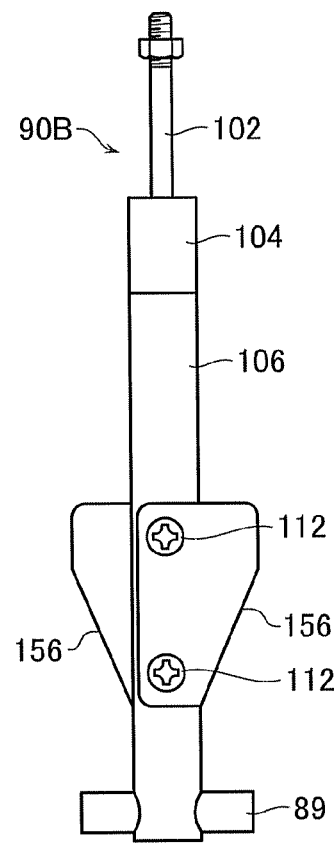
FIG. 17B A front view showing a stirring member according to another alternative to the second example of the present invention.
Figure 17C:
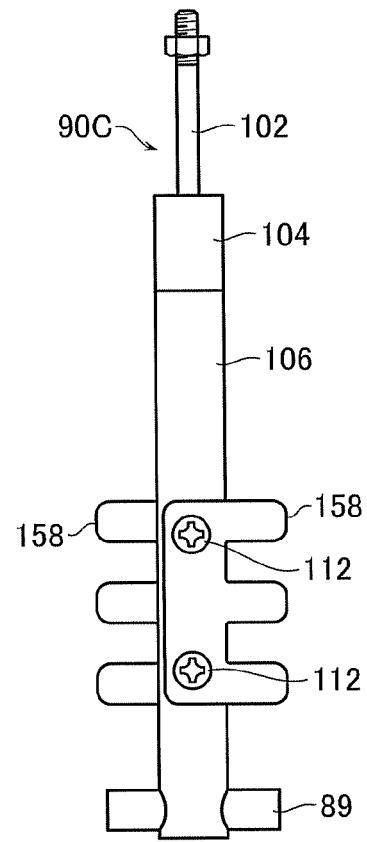
FIG. 17C A front view showing a stirring member according to another alternative to the second example of the present invention.
Figure 18:
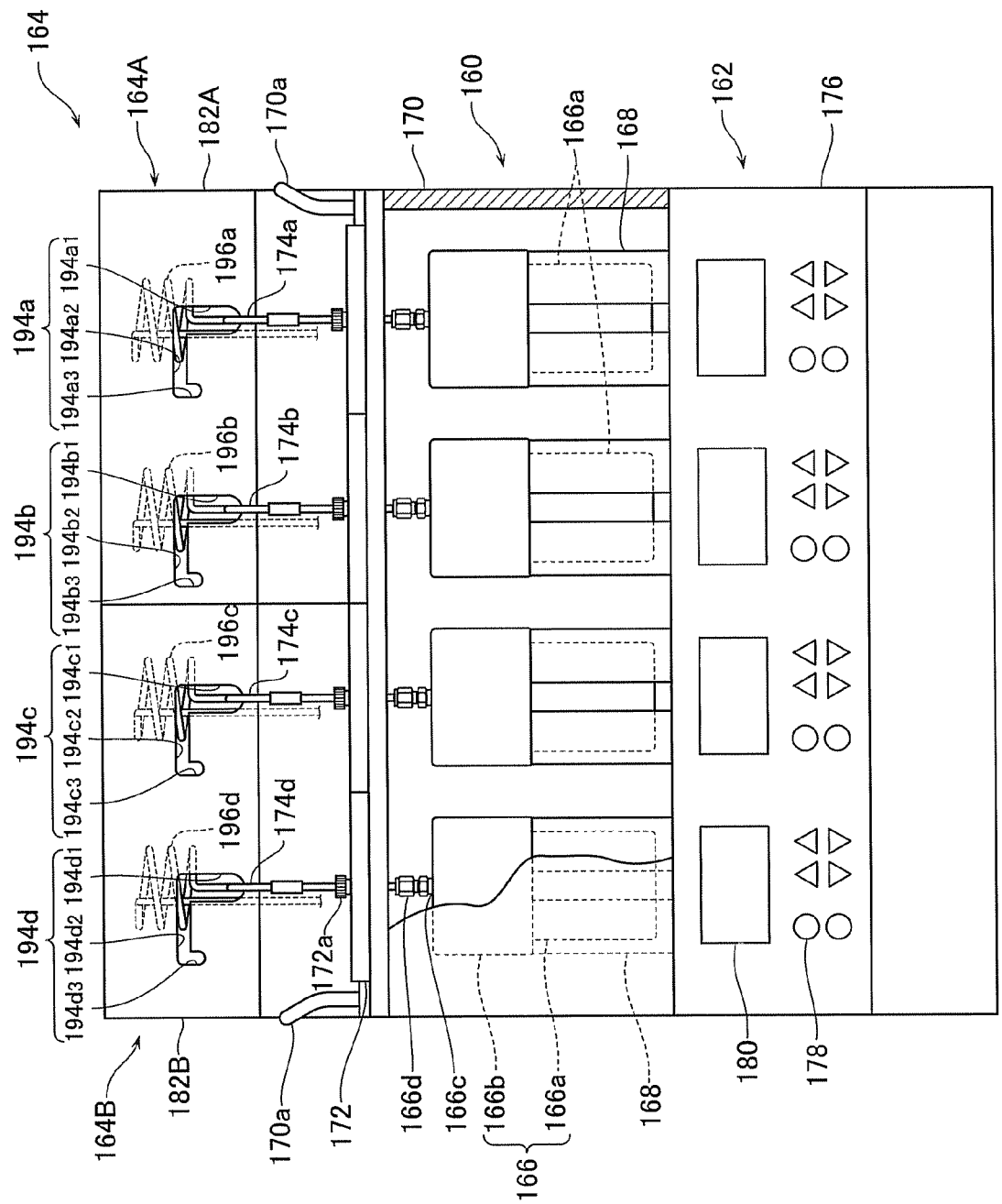
FIG. 18 A front schematic view of an organic synthesizer according to a third example of the present invention.
Figure 19:
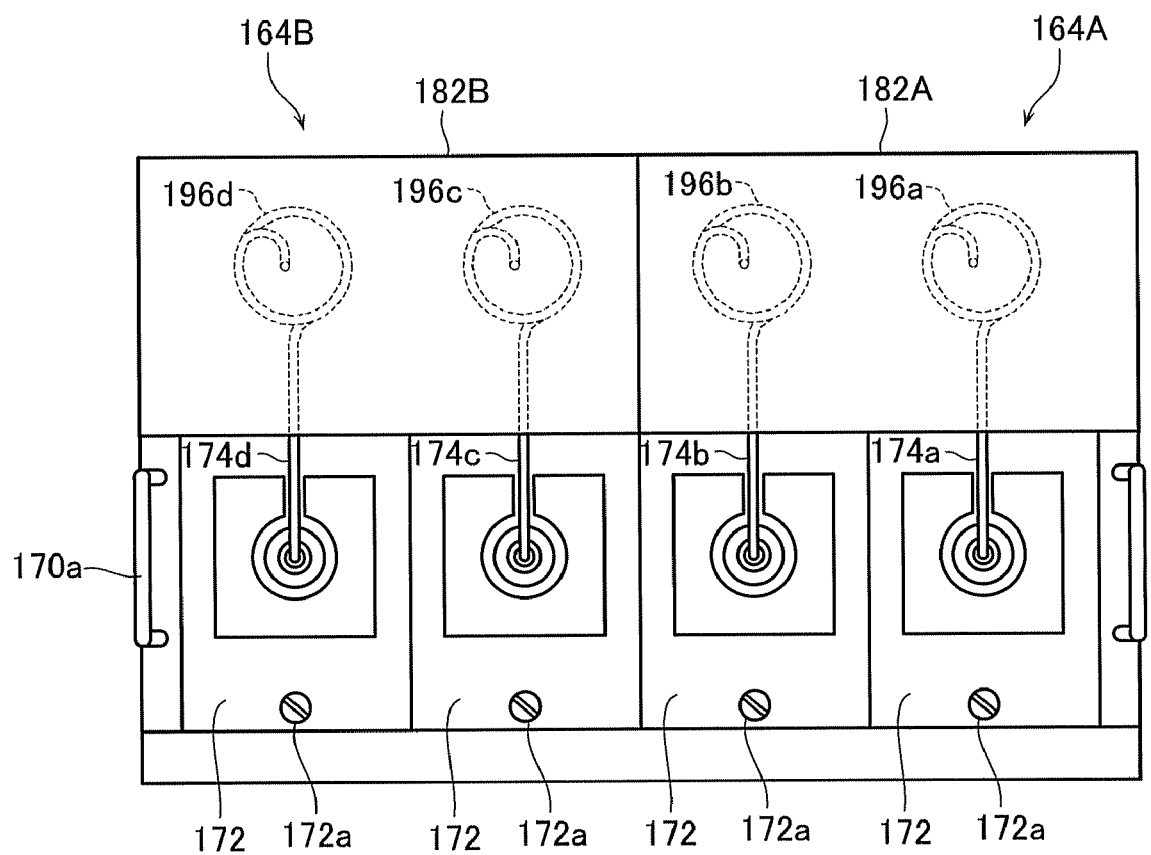
FIG. 19 A plan view of the organic synthesizer according to the third example of the present invention.
Figure 20:
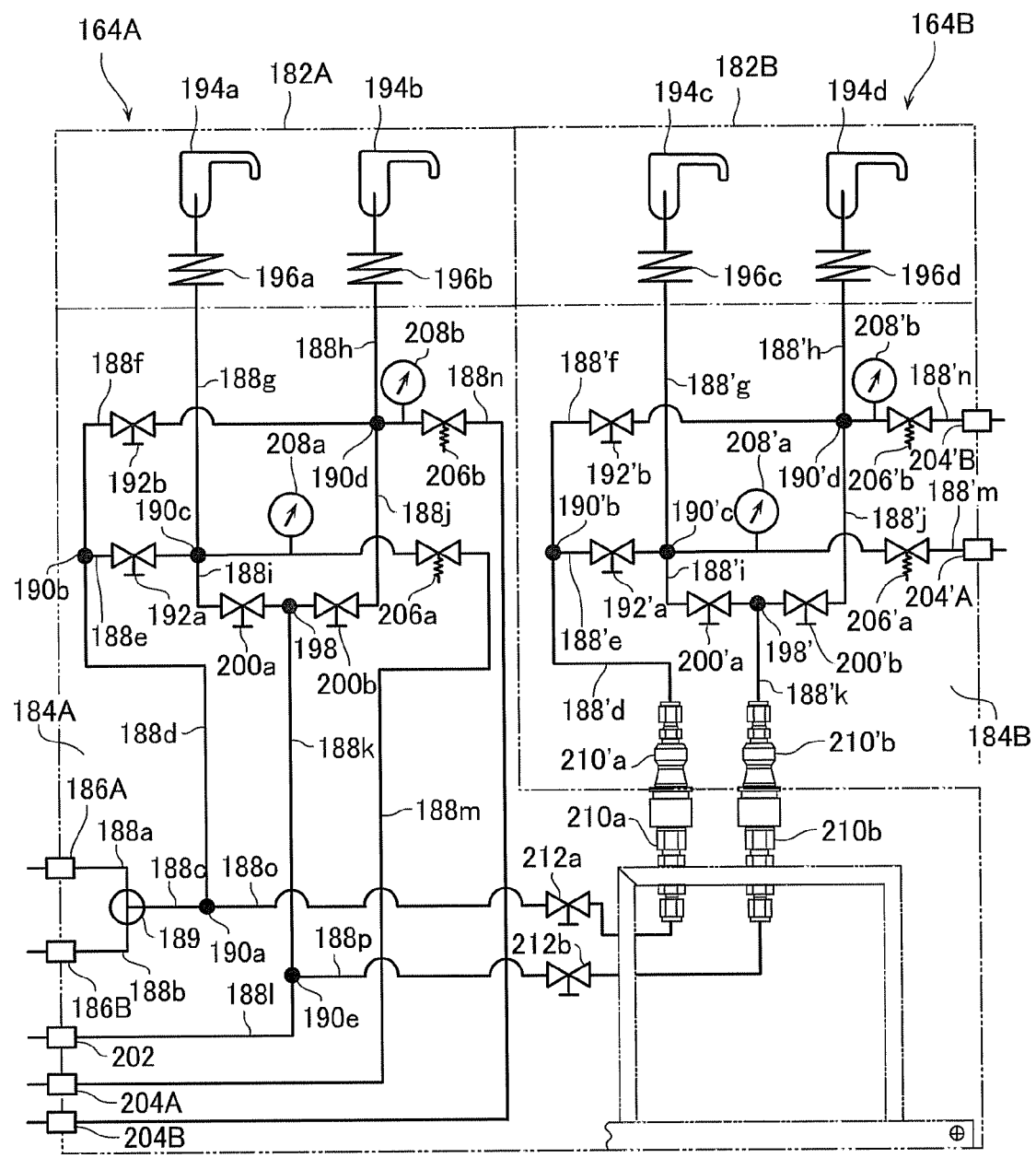
FIG. 20 A rear cross-sectional schematic view showing a pressure-regulating unit in the organic synthesizer according to the third example of the present invention.
Figure 21:
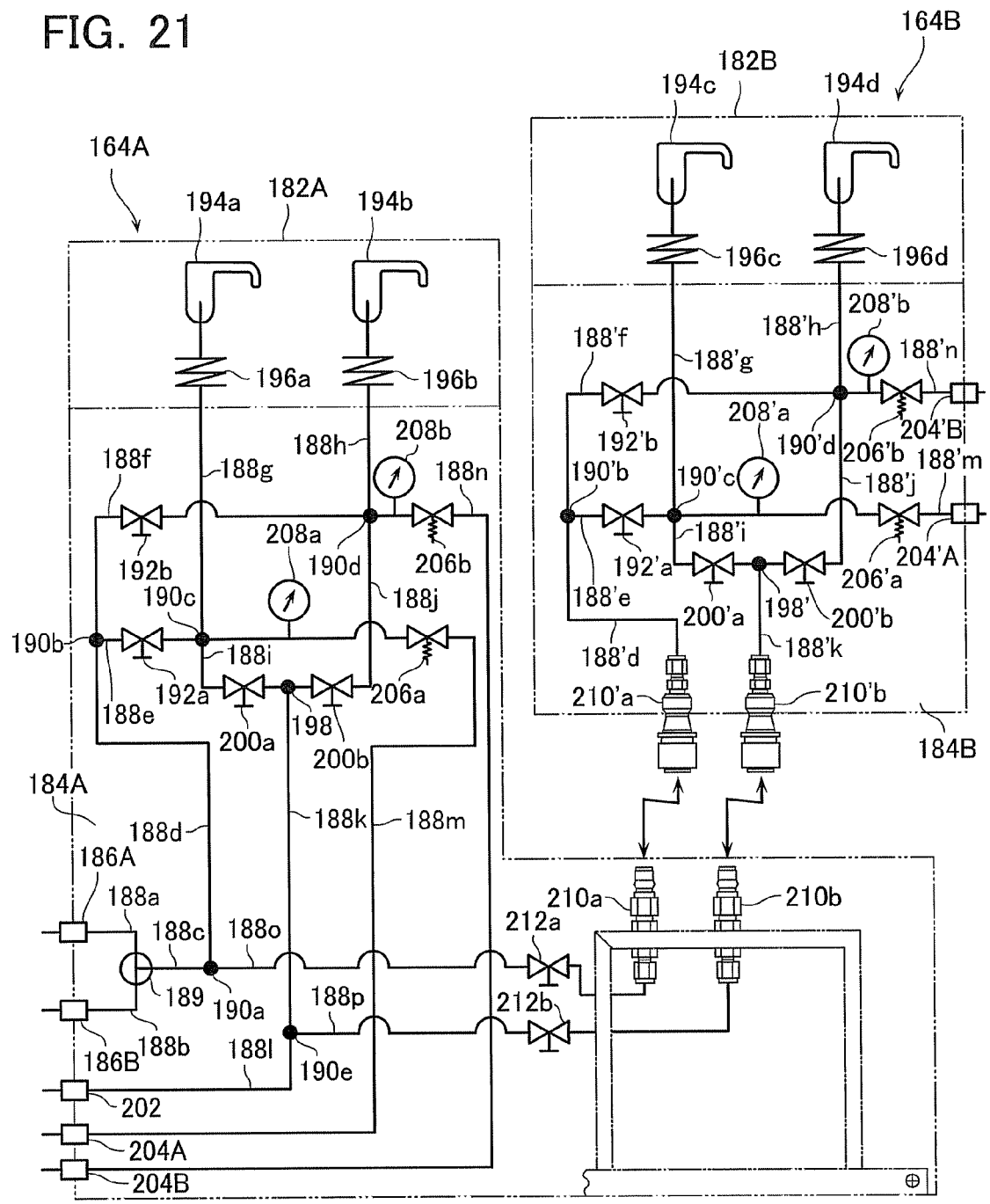
FIG. 21 A diagram corresponding to FIG. 20 and showing the organic synthesizer according to the third example of the present invention, in which a second pressure regulating-unit is removed from a first pressure-regulating unit.
Figure 22:
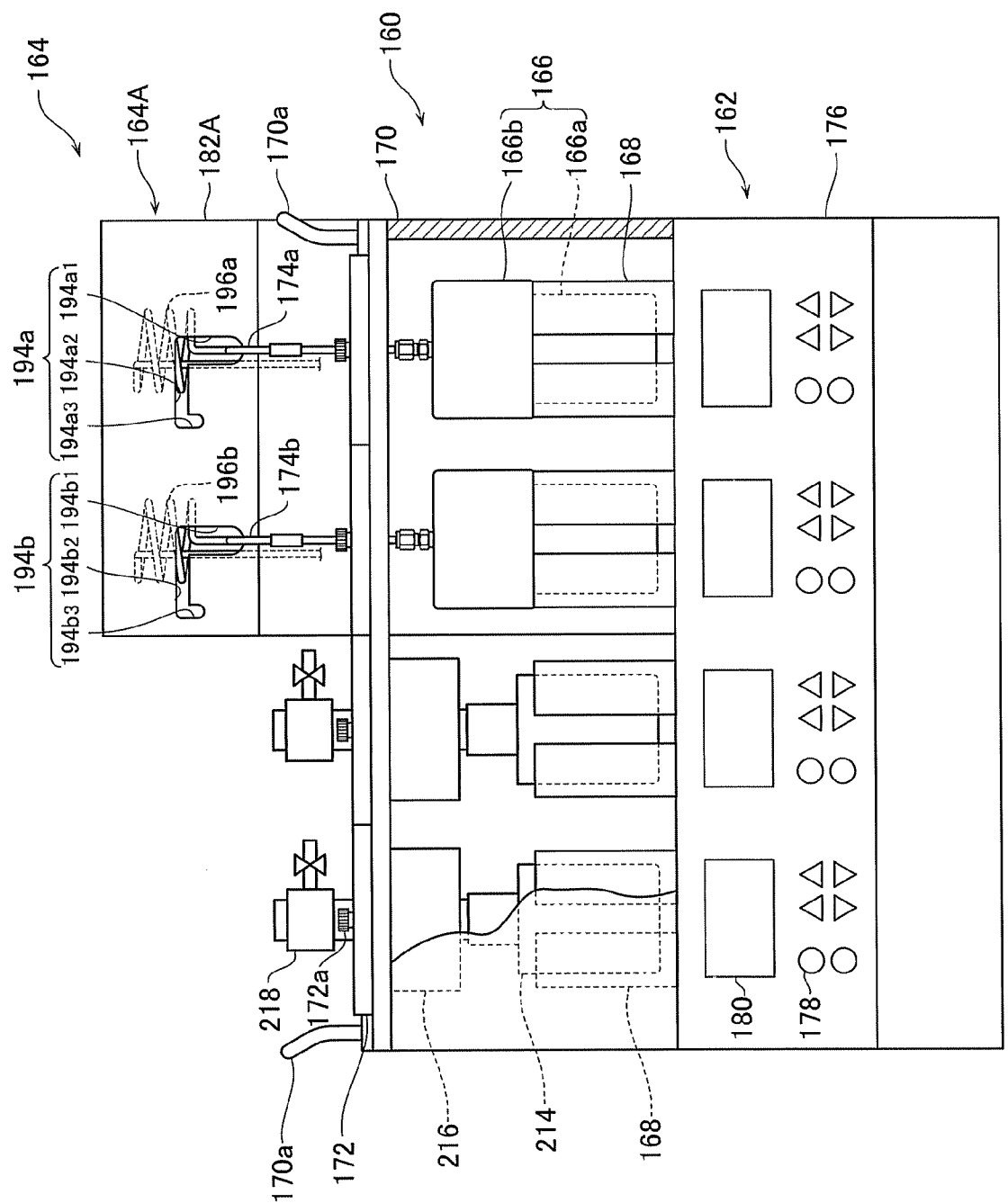
FIG. 22 A diagram corresponding to FIG. 18 and showing the organic synthesizer according to the third example of the present invention, in which a second pressure-regulating unit is removed therefrom and an atmospheric vessel is attached thereto.
Figure 23:
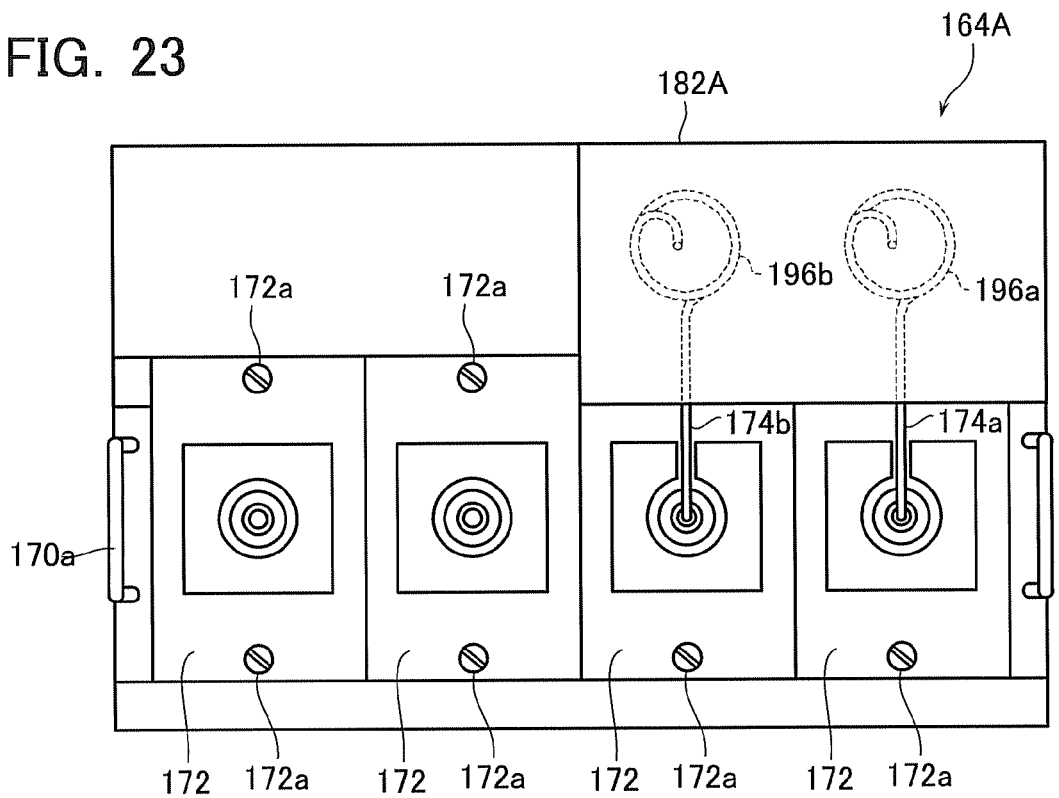
FIG. 23 A diagram corresponding to FIG. 19 and showing the organic synthesizer according to the third example of the present invention, in which a second pressure-regulating unit is removed therefrom and an atmospheric vessel is attached thereto.
Figure 24A:
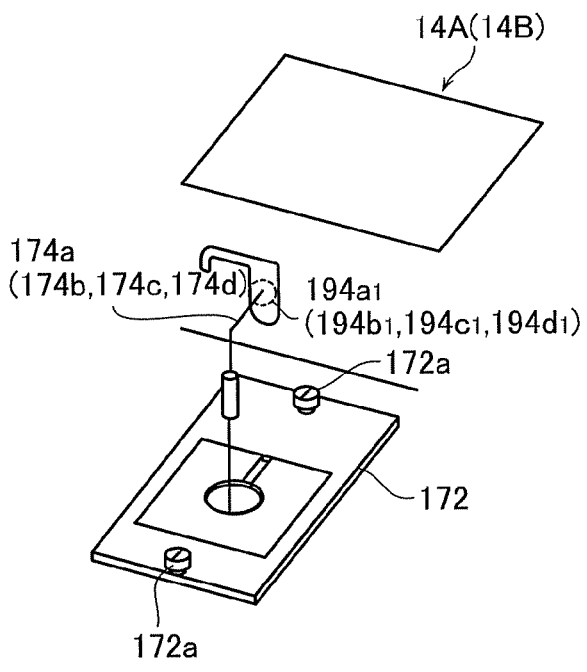
FIG. 24A A perspective view showing part of operation on removal of a reaction vessel from the organic synthesizer according to the third example of the present invention.
Figure 24B:
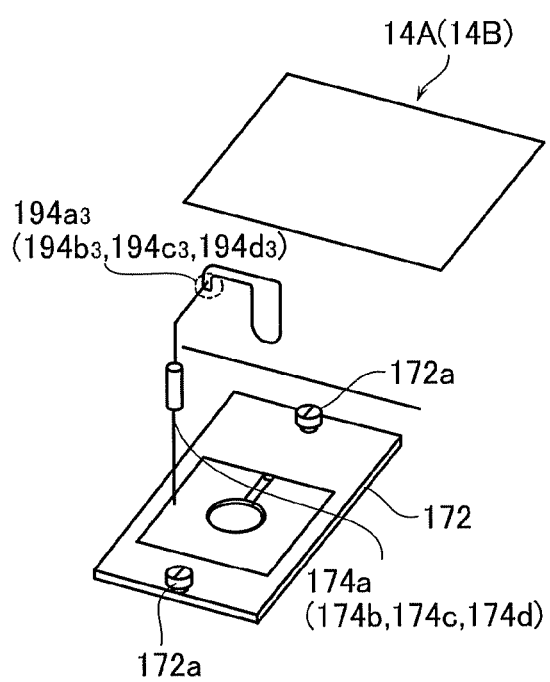
FIG. 24B A perspective view showing part of operation on removal of a reaction vessel from the organic synthesizer according to the third example of the present invention.
Figure 25:
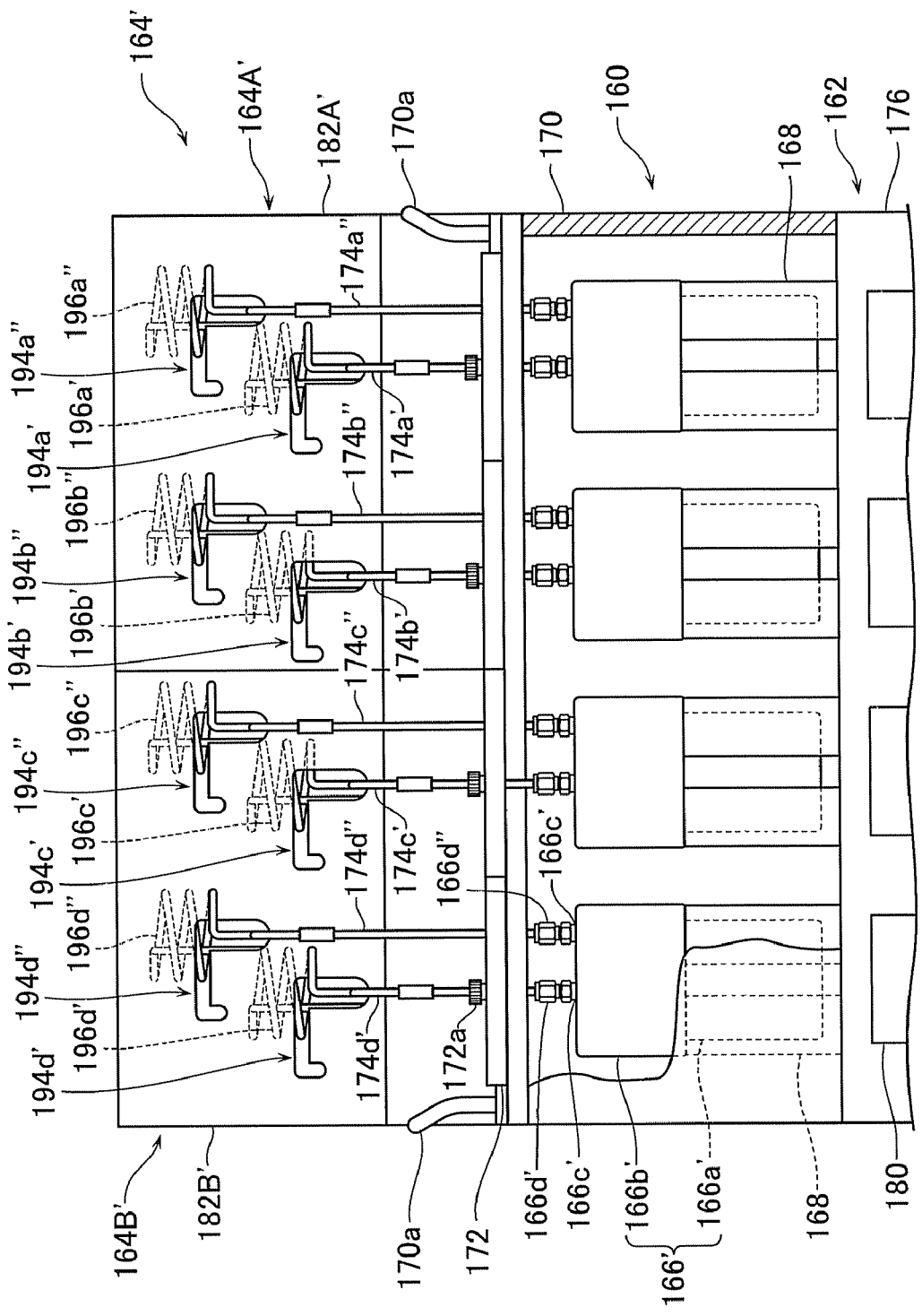
FIG. 25 A front schematic view of an organic synthesizer according to a first alternative to the third example of the present invention.
Figure 26:
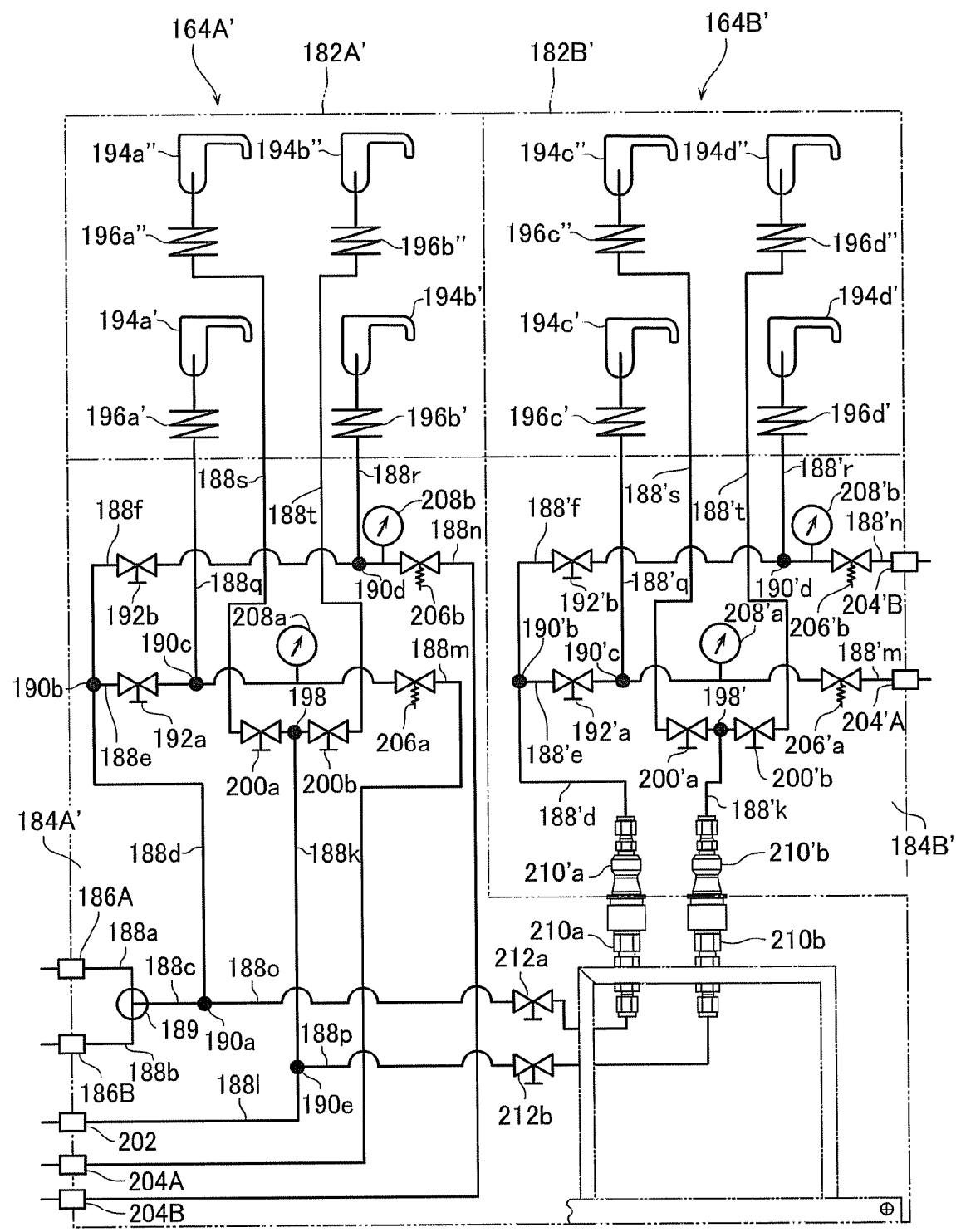
FIG. 26 A rear cross-sectional schematic view showing a pressure-regulating unit in the organic synthesizer according to the first alternative to the third example of the present invention.
Figure 27A:
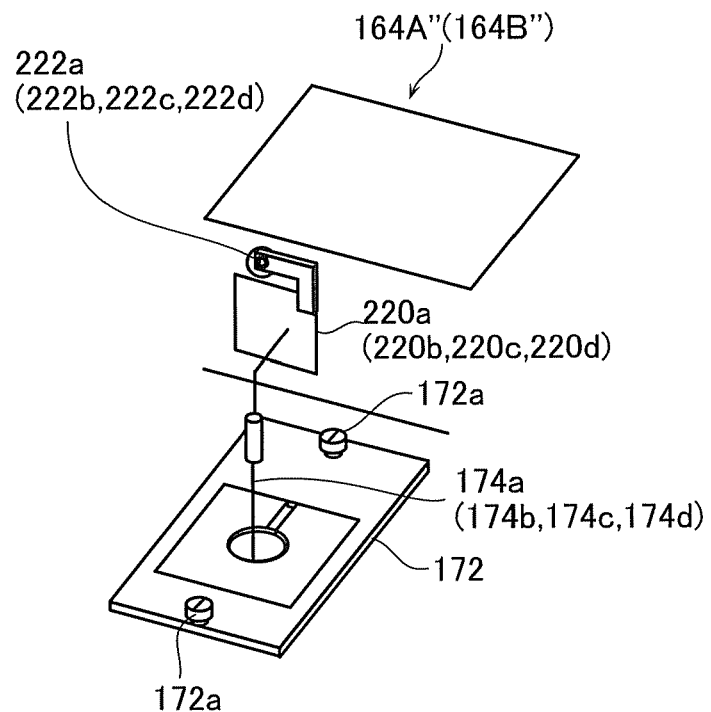
FIG. 27A A perspective view showing part of operation on removal of a reaction vessel from the organic synthesizer according to a second alternative to the third example of the present invention.
Figure 27B:
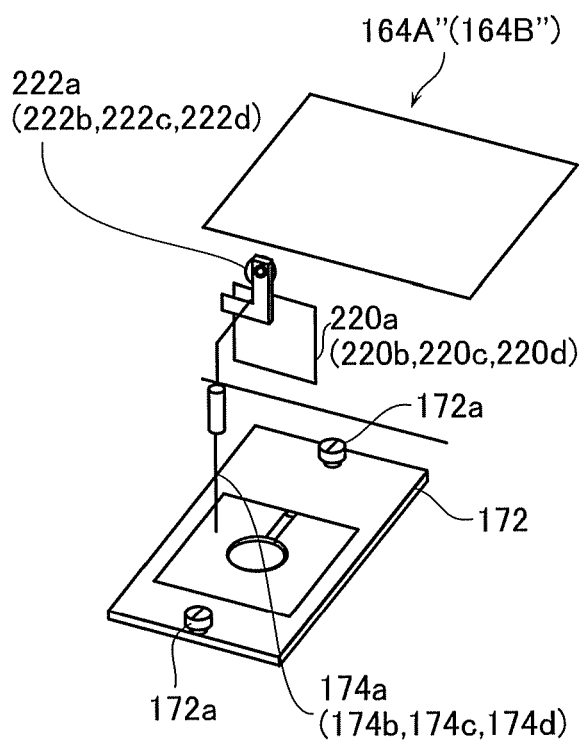
FIG. 27B A perspective view showing part of operation on removal of a reaction vessel from the organic synthesizer according to the second alternative to the third example of the present invention.
Figure 28:
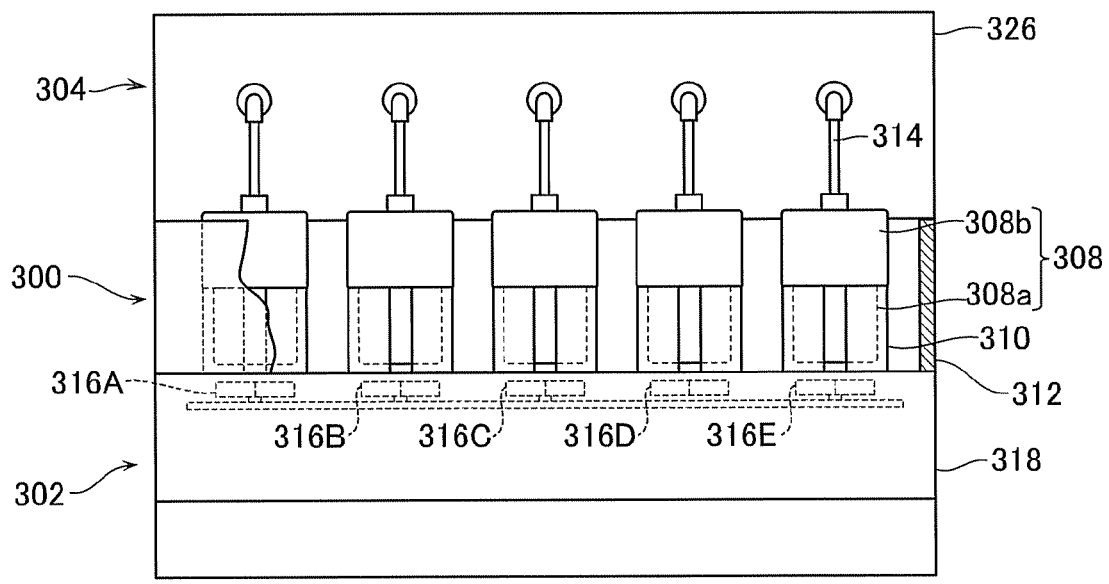
FIG. 28 front schematic view showing an organic synthesizer of prior art.
Figure 29:
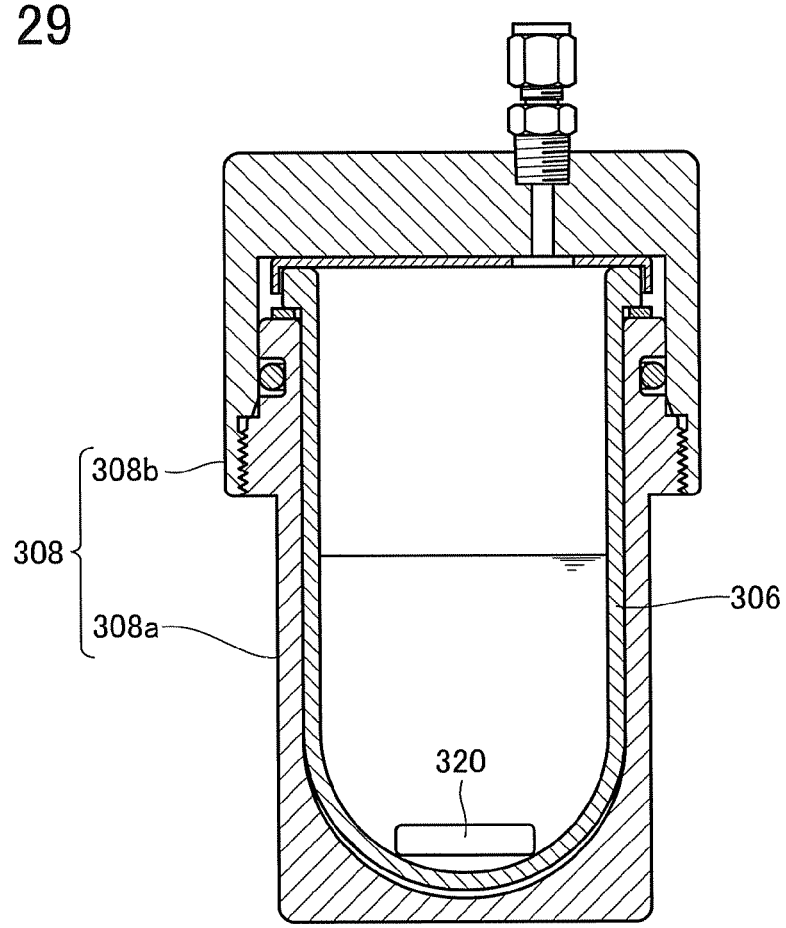
FIG. 29 A sectioned side view showing a pressure-proof vessel in the organic synthesizer of prior art.
Figure 30:
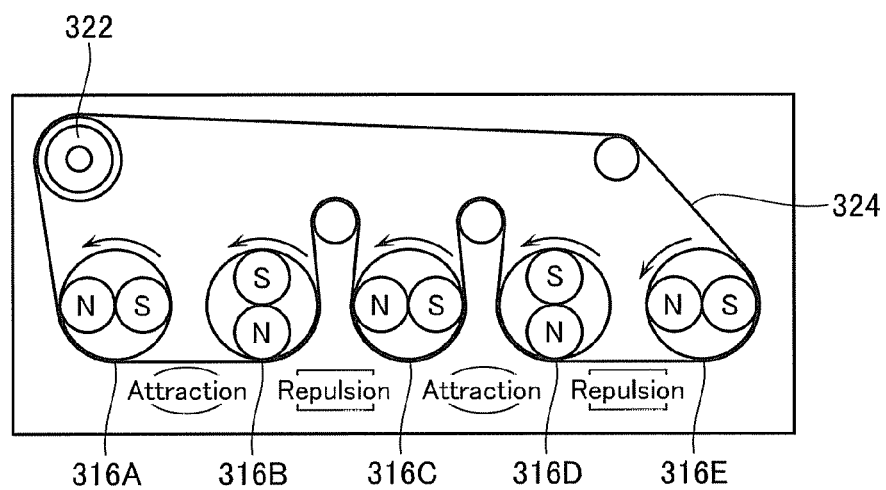
FIG. 30 A schematic view showing an arrangement of rotary magnet units in a stirring unit in the organic synthesizer of prior art.
Figure 31A:
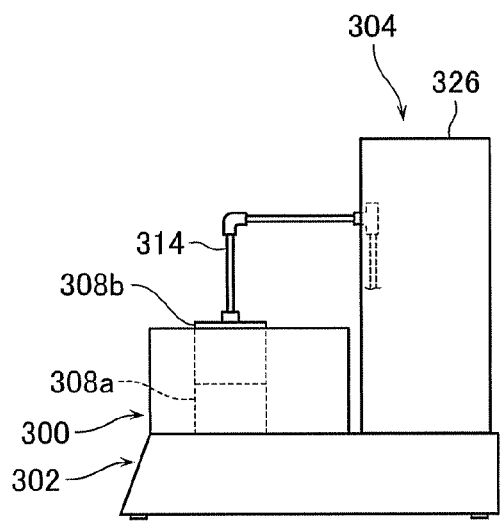
FIG. 31A A side schematic view of the organic synthesizer of prior art.
Figure 31B:
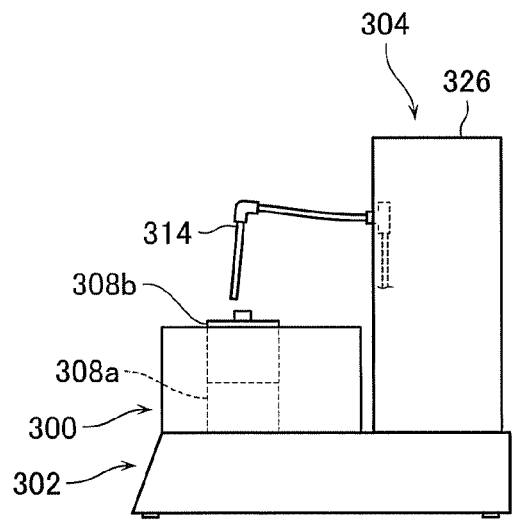
FIG. 31B A side schematic view showing part of operation on removal of a reaction vessel from the organic synthesizer of prior art.

DESCRIPTION OF REFERENCE NUMERALS 10, 62, 160 Reaction Vessel Support
12, 66, 162 Stirring Unit
64, 164 Pressure-Regulating Unit
68, 166 Pressure-proof Vessel

The invention claimed is:

1. An organic synthesizer, comprising: a reaction vessel support capable of supporting two or more reaction vessels; and two or more stirring means provided at respective positions aligned with the reaction vessels supported on the reaction vessel support and operative to move stirrers contained together with reagents within the supported reaction vessels in accordance with displacements of the magnetic field so as to stir the reagents within the supported reaction vessels, the organic synthesizer further comprising a magnetic field shielding means operative to prevent the displacement of the magnetic field on one of the adjacent two or more stirring means from influencing on the magnetic field on the other stirring means, wherein the magnetic field shielding means is formed in the shape of a ring that surrounds the portion of the stirring means where the displacement of the magnetic field arises.

2. An organic synthesizer, comprising: a reaction vessel container formed in the shape of a bottomed-cylinder capable of containing a reaction vessel therein; and a stirring means provided at a position aligned with the reaction vessel contained in the reaction vessel container and operative to rotate a stirrer contained together with a reagent within the reaction vessel in accordance with displacements of the magnetic field so as to stir the reagent within the supported reaction vessel wherein the reaction vessel container includes an urging means operative to urge the reaction vessel such that the contained reaction vessel is arranged at a position where a central axis thereof matches the central position of the reaction vessel container, wherein the reaction vessel container has an inner circumferential surface with a groove formed along the entire circumference, wherein the urging means is arranged in the groove and formed in the shape of an annulus having at least three corners and is configured such that part of each side protrudes inward from the groove.

3. An organic synthesizer, comprising: a reaction vessel support capable of supporting a reaction vessel; and a pressure regulating means operative to supply or discharge a gas so as to regulate pressure in the reaction vessel supported on the reaction vessel support, wherein the pressure regulating means includes a gas supply/discharge pipe configured such that the vicinity of the tip thereof is capable of flexing vertically and laterally and connected to the supported reaction vessel for supplying and discharging the gas, and a gas supply/discharge pipe support configured to support the gas supply/discharge pipe, wherein the gas supply/discharge pipe support is configured such that the vicinity of the tip of the gas supply/discharge pipe moves to an upper position from the position connected to the reaction vessel, then moves from the upper position to a position shifted to either left or right from the vertical axis of the reaction vessel, and stays at the position.

4. The organic synthesizer according to claim 3, wherein the gas supply/discharge pipe is partly formed helical.

* * * * *

UNITED STATES PATENT AND TRADEMARK OFFICE
CERTIFICATE OF CORRECTION

| | | |
|---|---|---|
| PATENT NO. | : 7,892,497 B2 | Page 1 of 1 |
| APPLICATION NO. | : 12/063475 | |
| DATED | : February 22, 2011 | |
| INVENTOR(S) | : Masatoshi Shibata et al. | |

It is certified that error appears in the above-identified patent and that said Letters Patent is hereby corrected as shown below:

Column 17, Line 44, "and 200h." should be -- and 200b. --

Column 20, Line 8, "1889, 188h," should be -- 188g, 188h, --

Signed and Sealed this
Fourth Day of October, 2011

David J. Kappos
*Director of the United States Patent and Trademark Office*